US010735862B2

(12) United States Patent
Keilwert et al.

(10) Patent No.: US 10,735,862 B2
(45) Date of Patent: Aug. 4, 2020

(54) ELECTRONIC GAMING MACHINE AND METHOD WITH A STEREO ULTRASOUND SPEAKER CONFIGURATION PROVIDING BINAURALLY ENCODED STEREO AUDIO

(71) Applicant: IGT, Las Vegas, NV (US)

(72) Inventors: Stefan Keilwert, St. Josef (AT); David Small, Moncton (CA); David Froy, Lakeville-Westmorland (CA); Klaus Achmueller, Kalsdorf bei Graz (AT)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 16/053,187

(22) Filed: Aug. 2, 2018

(65) Prior Publication Data

US 2020/0045421 A1    Feb. 6, 2020

(51) Int. Cl.
| | | |
|---|---|---|
| *H04S 7/00* | (2006.01) | |
| *H04R 5/02* | (2006.01) | |
| *H04R 5/04* | (2006.01) | |
| *G10L 19/008* | (2013.01) | |
| *G06F 3/0481* | (2013.01) | |
| *G06F 3/01* | (2006.01) | |
| *G02B 30/00* | (2020.01) | |

(52) U.S. Cl.
CPC .............. *H04R 5/02* (2013.01); *G02B 30/00* (2020.01); *G06F 3/012* (2013.01); *G06F 3/04815* (2013.01); *G10L 19/008* (2013.01); *H04R 5/04* (2013.01); *H04S 7/303* (2013.01); *A63F 2300/64* (2013.01); *H04R 2217/03* (2013.01)

(58) Field of Classification Search
CPC ............. G07F 17/3202; G07F 17/3204; A63F 2300/6081; H04R 1/20; H04R 1/32; H04R 1/323; H04R 2201/40; H04R 5/02; H04R 5/023; H04S 2420/01; H04S 2400/11; H04S 7/302; H04S 7/303
See application file for complete search history.

(56) References Cited

U.S. PATENT DOCUMENTS

| | | |
|---|---|---|
| 3,831,172 A | 8/1974 | Olliges et al. |
| 4,339,798 A | 7/1982 | Hedges et al. |
| 4,363,482 A | 12/1982 | Goldfarb |
| 4,496,149 A | 1/1985 | Schwartzberg |
| 4,582,324 A | 4/1986 | Koza et al. |
| 4,618,150 A | 10/1986 | Kimura |
| 4,624,459 A | 11/1986 | Kaufman |
| 4,660,107 A | 4/1987 | Chippendale, Jr. |
| 4,695,053 A | 9/1987 | Vazquez, Jr. et al. |
| 4,974,857 A | 12/1990 | Beall et al. |
| 5,096,195 A | 3/1992 | Gimmon |
| 5,179,517 A | 1/1993 | Sarbin et al. |
| 5,221,801 A | 6/1993 | Bruti et al. |

(Continued)

OTHER PUBLICATIONS

Wikipedia, "Binaural recording" available at https://en.wikipedia.org/wiki/Binaural_recording, printed on May 14, 2018 (8 pages).

(Continued)

*Primary Examiner* — Kile O Blair
(74) *Attorney, Agent, or Firm* — Neal, Gerber & Eisenberg LLP

(57) ABSTRACT

An electronic gaming machine and methods of operating an electronic gaming machine that provide binaurally encoded audio using a stereo ultrasound speaker configuration.

21 Claims, 16 Drawing Sheets

(56) References Cited

U.S. PATENT DOCUMENTS

| | | |
|---|---|---|
| 5,242,163 A | 9/1993 | Fulton |
| 5,275,400 A | 1/1994 | Weingardt et al. |
| 5,342,047 A | 8/1994 | Heidel et al. |
| 5,371,345 A | 12/1994 | LeStrange et al. |
| 5,390,938 A | 2/1995 | Takeya |
| 5,393,061 A | 2/1995 | Manship et al. |
| 5,429,507 A | 7/1995 | Kaplan |
| 5,430,835 A | 7/1995 | Williams et al. |
| 5,449,173 A | 9/1995 | Thomas et al. |
| 5,472,197 A | 12/1995 | Gwiasda et al. |
| 5,668,996 A | 9/1997 | Radinsky |
| 5,695,188 A | 12/1997 | Ishibashi |
| 5,697,843 A | 12/1997 | Manship et al. |
| 5,707,286 A | 1/1998 | Carlson |
| 5,762,552 A | 6/1998 | Vuong et al. |
| 5,766,074 A | 6/1998 | Cannon et al. |
| 5,772,509 A | 6/1998 | Weiss |
| 5,792,972 A | 8/1998 | Houston |
| 5,807,172 A | 9/1998 | Piechowiak |
| 5,833,538 A | 11/1998 | Weiss |
| 5,839,958 A | 11/1998 | Ozarow |
| 5,848,932 A | 12/1998 | Adams |
| 5,876,284 A | 3/1999 | Acres et al. |
| 5,902,184 A | 5/1999 | Bennett et al. |
| 5,908,354 A | 6/1999 | Okuniewicz |
| 5,910,048 A | 6/1999 | Feinberg |
| 5,967,894 A | 10/1999 | Kinoshita et al. |
| 5,997,401 A | 12/1999 | Crawford |
| 6,015,346 A | 1/2000 | Bennett |
| D421,277 S | 2/2000 | McGahn et al. |
| 6,056,642 A | 5/2000 | Bennett |
| 6,062,979 A | 5/2000 | Inoue |
| 6,071,192 A | 6/2000 | Weiss |
| 6,084,169 A | 7/2000 | Hasegawa et al. |
| 6,089,976 A | 7/2000 | Schneider et al. |
| 6,089,978 A | 7/2000 | Adams |
| 6,102,400 A | 8/2000 | Scott et al. |
| 6,106,393 A | 8/2000 | Sunaga et al. |
| 6,110,041 A | 8/2000 | Walker et al. |
| 6,110,043 A | 8/2000 | Olsen |
| 6,113,495 A | 9/2000 | Walker |
| 6,117,009 A | 9/2000 | Yoseloff |
| 6,126,165 A | 10/2000 | Sakamoto |
| 6,142,875 A | 11/2000 | Kodachi et al. |
| 6,146,273 A | 11/2000 | Olsen |
| 6,146,276 A | 11/2000 | Okuniewicz |
| 6,155,925 A | 12/2000 | Giobbi et al. |
| 6,159,097 A | 12/2000 | Gura |
| 6,174,233 B1 | 1/2001 | Sunaga et al. |
| 6,174,235 B1 | 1/2001 | Walker |
| 6,175,632 B1 | 1/2001 | Marx |
| 6,217,448 B1 | 4/2001 | Olsen |
| 6,238,288 B1 | 5/2001 | Walker et al. |
| 6,241,612 B1 | 6/2001 | Heredia |
| 6,254,481 B1 | 7/2001 | Jaffe |
| 6,270,411 B1 | 8/2001 | Gura et al. |
| 6,302,790 B1 | 10/2001 | Brossard |
| 6,306,034 B1 | 10/2001 | Sakamoto et al. |
| 6,309,299 B1 | 10/2001 | Weiss |
| 6,309,301 B1 | 10/2001 | Sano |
| 6,328,648 B1 | 12/2001 | Walker et al. |
| 6,390,923 B1 | 5/2002 | Yoshitomi et al. |
| 6,409,596 B1 | 6/2002 | Hayashida et al. |
| 6,416,411 B1 | 7/2002 | Tsukahara |
| 6,537,152 B2 | 3/2003 | Seelig et al. |
| 6,544,122 B2 | 4/2003 | Araki et al. |
| 6,554,703 B1 | 4/2003 | Bussick et al. |
| 6,561,908 B1 | 5/2003 | Hoke |
| 6,599,195 B1 | 7/2003 | Araki et al. |
| 6,638,169 B2 | 10/2003 | Wilder et al. |
| 6,656,046 B1 | 12/2003 | Yoseloff et al. |
| 6,729,618 B1 | 5/2004 | Koenig et al. |
| 6,848,996 B2 | 2/2005 | Hecht et al. |
| 6,935,955 B1 | 8/2005 | Kaminkow et al. |
| 6,939,226 B1 | 9/2005 | Joshi |
| 7,105,736 B2 | 9/2006 | Laakso |
| 7,258,613 B2 | 8/2007 | Lucchesi et al. |
| 7,355,112 B2 | 4/2008 | Laakso |
| 7,666,098 B2 | 2/2010 | Hecht et al. |
| 7,708,642 B2 | 5/2010 | Hecht et al. |
| 7,867,085 B2 | 1/2011 | Pryzby et al. |
| 7,892,091 B2 | 2/2011 | Laakso et al. |
| 7,901,291 B2 | 3/2011 | Hecht et al. |
| 8,025,562 B2 | 9/2011 | Walker et al. |
| 8,025,566 B2 | 9/2011 | Walker et al. |
| 8,029,353 B2 | 10/2011 | Walker et al. |
| 8,029,362 B2 | 10/2011 | Walker et al. |
| 8,077,195 B2 | 12/2011 | Großmann |
| 8,113,935 B2 | 2/2012 | Walker et al. |
| 8,184,824 B2 * | 5/2012 | Hettinger ............... G07F 17/32 |
| | | 381/302 |
| 8,360,841 B2 | 1/2013 | Walker et al. |
| 8,485,881 B2 | 7/2013 | Griswold et al. |
| 8,591,308 B2 | 11/2013 | Hoffman et al. |
| 8,690,662 B2 | 4/2014 | Walker et al. |
| 8,702,517 B2 | 4/2014 | Walker et al. |
| 8,758,131 B2 | 6/2014 | Decker et al. |
| 8,777,744 B2 | 7/2014 | Basallo et al. |
| 8,814,649 B2 | 8/2014 | Walker et al. |
| 8,821,266 B2 | 9/2014 | Nicely |
| 8,992,298 B2 | 3/2015 | Walker et al. |
| 8,992,299 B2 | 3/2015 | Walker et al. |
| 9,033,799 B2 | 5/2015 | Decker et al. |
| 9,039,410 B2 | 5/2015 | Walker et al. |
| 9,630,106 B2 | 4/2017 | Decker et al. |
| 10,016,673 B1 | 7/2018 | Milligan et al. |
| 10,089,063 B2 * | 10/2018 | Thagadur Shivappa ................... |
| | | H04S 7/304 |
| 2002/0077165 A1 | 6/2002 | Bansemer et al. |
| 2003/0073490 A1 | 4/2003 | Hecht et al. |
| 2003/0100359 A1 | 5/2003 | Loose et al. |
| 2008/0113716 A1 | 5/2008 | Beadell et al. |
| 2012/0115608 A1 | 5/2012 | Pfeifer et al. |
| 2015/0213691 A1 | 7/2015 | Dunn |
| 2015/0243124 A1 | 8/2015 | Decker et al. |
| 2016/0092156 A1 | 3/2016 | Miura |
| 2016/0180644 A1 | 6/2016 | Idris et al. |
| 2016/0336022 A1 * | 11/2016 | Florencio ............ G10K 11/002 |
| 2017/0287287 A1 | 10/2017 | Froy et al. |
| 2017/0294072 A1 | 10/2017 | Achmuller et al. |
| 2018/0040190 A1 | 2/2018 | Keilert et al. |
| 2018/0078854 A1 | 3/2018 | Achmueller et al. |
| 2018/0089935 A1 | 3/2018 | Froy, Jr. |
| 2018/0130283 A1 | 5/2018 | Froy et al. |

OTHER PUBLICATIONS

"Focus on acoustic lenses" available at https://discovery.kaust.edu.sa/en/article/235/focus-on-acouslic-lenses, dated Jun. 25, 2016 (4 pages).

* cited by examiner

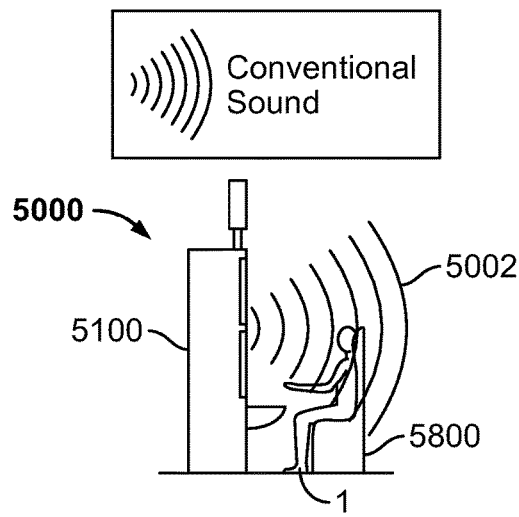
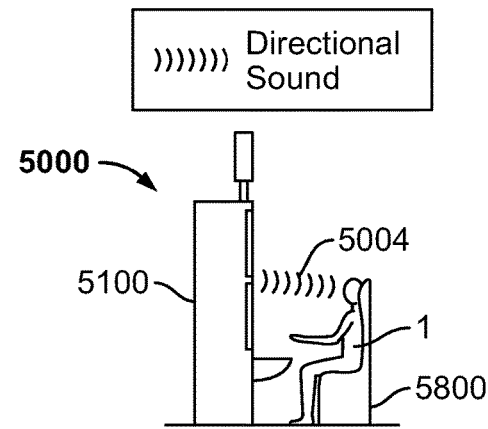
FIG. 15     FIG. 16
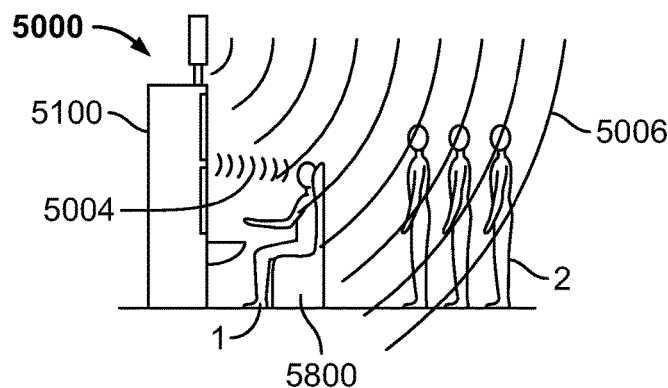
FIG. 17

ELECTRONIC GAMING MACHINE AND METHOD WITH A STEREO ULTRASOUND SPEAKER CONFIGURATION PROVIDING BINAURALLY ENCODED STEREO AUDIO

BACKGROUND

Various electronic gaming machines ("EGMs") may be operable to enable play of wagering games. Various EGMs may include one or more primary wagering games. Various EGMs may also include one or more secondary games. Various EGMs may initiate a play of the primary wagering game following receipt of a wager input by the player that indicates how much the player desires to wager. Various EGMs may determine any primary awards for a wagered-on play of the primary wagering game based on the wager amount and a randomly determined outcome of the play of the primary wagering game (such as the randomly determined position that each of the reels of a slot EGM will stop at).

SUMMARY

The present disclosure provides electronic gaming systems and electronic gaming machines having stereo ultrasound speaker configurations that provide binaurally encoded stereo audio, and methods of operating such systems and machines.

In various embodiments, the present disclosure provides an electronic gaming machine comprising: a housing; a display device supported by the housing; a head position tracker supported by the housing; a binaural audio system supported by the housing; and an ultrasound speaker array supported by the housing, wherein the ultrasound speaker array includes a plurality of transducers. The example electronic gaming machine also includes a processor and a memory device that stores a plurality of instructions that, when executed, cause the processor to: cause the display device to display a play of a game; cause the display device to display a 3D image to a player, wherein the 3D image includes a virtual object associated with 3D coordinates; operate with the head position tracker to capture player head position information; cause the binaural audio system to generate a stereo binaural audio stream including encoded binaural information based on the captured player head position information and the 3D coordinates associated with the virtual object; cause a first subset of transducers of the ultrasound speaker array to output a first sound beam based on the stereo binaural audio stream; and cause a second subset of transducers of the ultrasound speaker array to output a second sound beam based on the stereo binaural audio stream, wherein the first sound beam and the second sound beam are in a stereo configuration with respect to a position at which a player can be seated in front of the housing.

In various embodiments, the present disclosure provides an electronic gaming machine comprising: a housing; a first display device supported by the housing; a second display device supported by the housing and positioned adjacent to the first display device; a head position tracker supported by the housing; a binaural audio system supported by the housing; a first ultrasound speaker supported by the housing; and a second ultrasound speaker supported by the housing, wherein the first ultrasound speaker and the second ultrasound speaker are in a stereo configuration with respect to a first position at which a first player can be seated in front of the housing and with respect to a second position at which a second player can be seated in front of the housing. The example electronic gaming machine also includes a processor and a memory device that stores a plurality of instructions that, when executed, cause the processor to: cause the first display device and the second display device to display a play of a game; cause the first display device to display a first 3D image to the first player, wherein the first 3D image includes a first virtual object associated with 3D coordinates relative to the first display device; cause the second display device to display a second 3D image to the second player, wherein the second 3D image includes a second virtual object associated with 3D coordinates relative to the second display device; operate with the head position tracker to capture first player head position information associated with the first player; operate with the head position tracker to capture second player head position information associated with the second player; cause the binaural audio system to generate a stereo binaural audio stream including encoded binaural information based on the first player head position information, the second player head position information, the 3D coordinates associated with the first virtual object, and the 3D coordinates associated with the second virtual object; cause the first ultrasound speaker to output a first sound beam based on the stereo binaural audio stream in a direction of the first player; and cause the second ultrasonic speaker to output a second sound beam based on the stereo binaural audio stream in a direction of the second player.

In various embodiments, the present disclosure provides an electronic gaming system comprising an electronic gaming machine and a gaming chair. The example electronic gaming machines includes a housing; a display device supported by the housing; a head position tracker supported by the housing; a binaural audio system supported by the housing; a first ultrasound speaker supported by the housing; a second ultrasound speaker supported by the housing, wherein the first ultrasound speaker and the second ultrasound speaker are in a stereo configuration with respect to a player position in front of the housing. The example electronic gaming machine also includes a processor and a memory device that stores a plurality of instructions that, when executed, cause the processor to: cause the display device to display a play of a game; cause the display device to display a 3D image to a player, wherein the 3D image includes a virtual object associated with 3D coordinates; operate with the head position tracker to capture player head position information; cause the binaural audio system to generate a stereo binaural audio stream including encoded binaural information based on the captured player head position information and the 3D coordinates associated with the virtual object; cause the first ultrasound speaker to output a first sound beam based on the stereo binaural audio stream; and cause the second ultrasound speaker to output a second sound beam based on the stereo binaural audio stream. The example electronic gaming system also includes the gaming chair including: a frame; a third ultrasound speaker supported by the frame; and a fourth ultrasound speaker supported by the frame, wherein the third ultrasound speaker and the fourth ultrasound speaker are in a stereo configuration with respect to the player position at which a player can be seated in the gaming chair.

Additional features and advantages are described in, and will be apparent from, the following Detailed Description and the Figures.

BRIEF DESCRIPTION OF THE FIGURES

FIG. 15 is a side view of the EGM and the gaming chair of FIG. 10.

FIG. 16 is another side view of the EGM and the gaming chair of FIG. 10.

FIG. 17 is a top view of a plurality of EGMs and a plurality of gaming chairs of FIG. 10.

DETAILED DESCRIPTION

Figure 1:
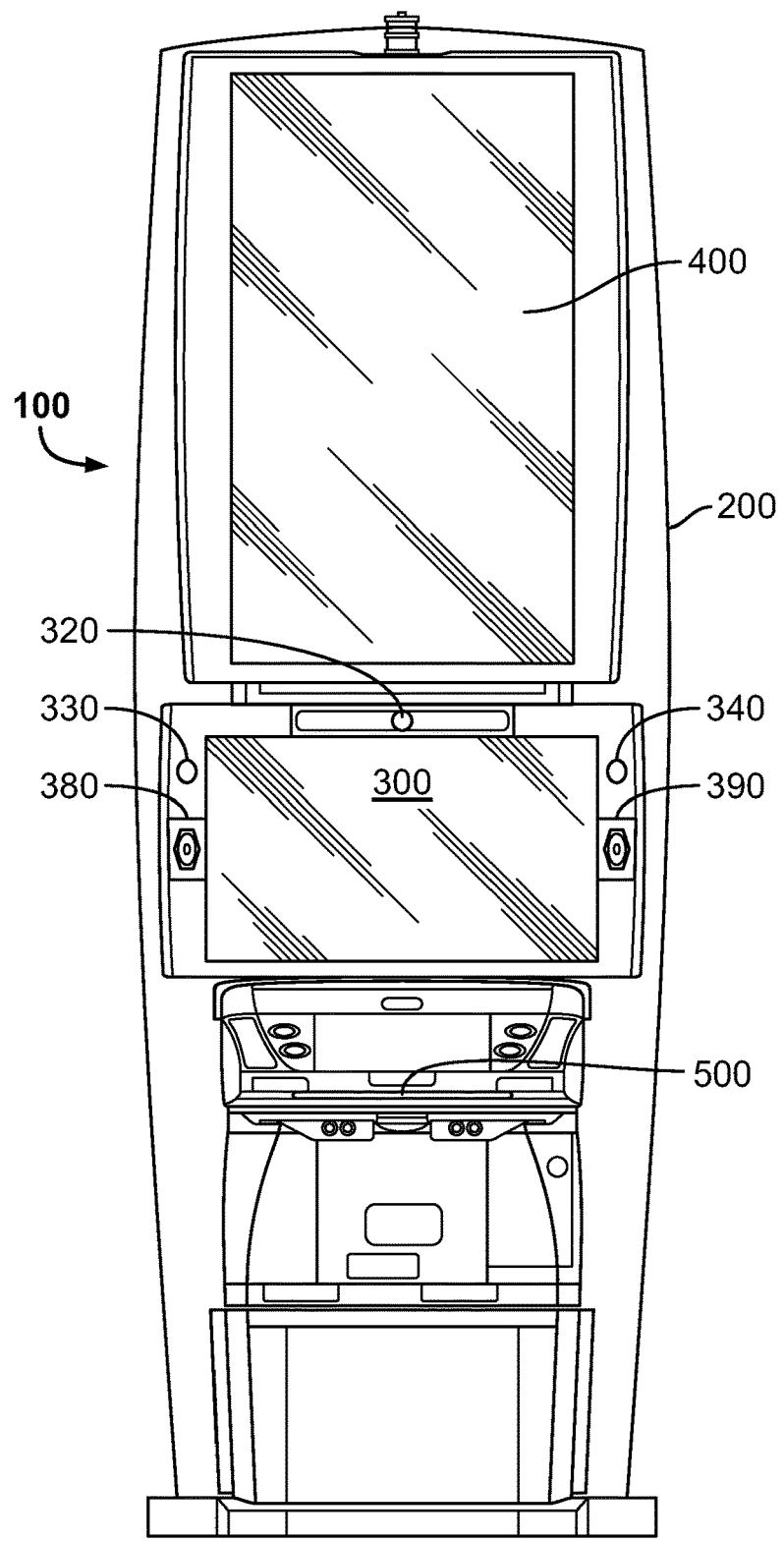
FIG. 1 is a front view of one example embodiment of an electronic gaming machine ("EGM") of the present disclosure."
Figure 2:
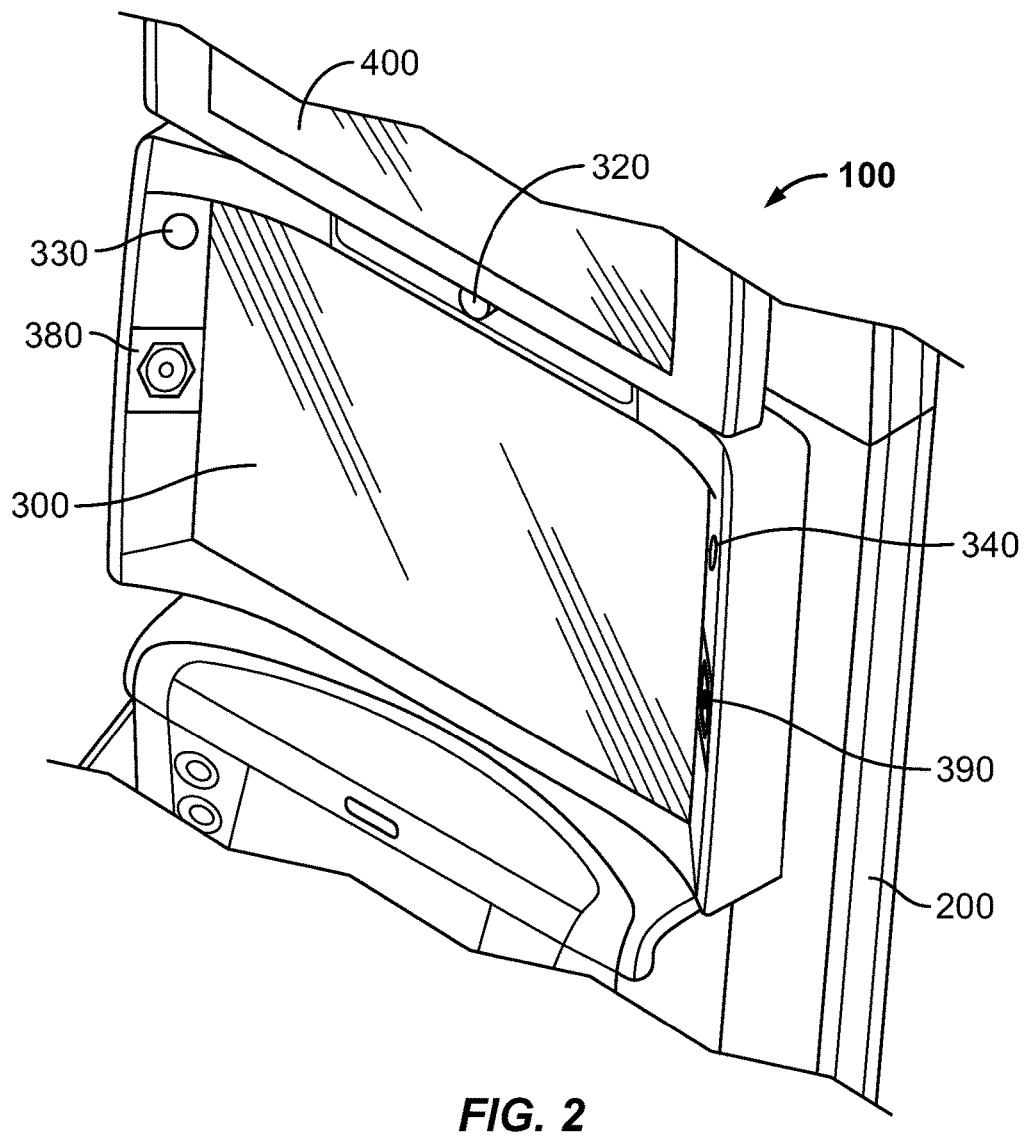
FIG. 2 is an enlarged fragmentary front perspective view of the central portion of the EGM of FIG. 1.
Figure 3:
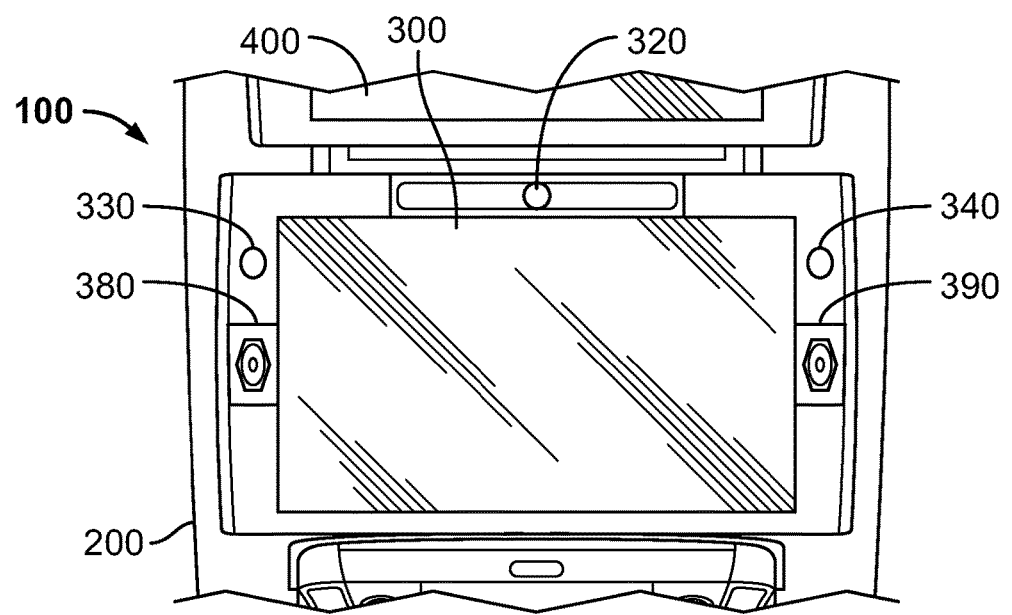
FIG. 3 is an enlarged fragmentary front view of the central portion of the EGM of FIG. 1.

The present disclosure provides new EGMs and methods of operating such new EGMs. For brevity and clarity, and unless specifically stated otherwise, the term "EGM" is used herein to refer to an electronic gaming machine (such as but not limited to a slot machine, a video poker machine, a video card machine, a video lottery terminal (VLT), a video keno machine, or a video bingo machine).

Various embodiments of the present disclosure provide also new gaming chairs (and methods of operating such new gaming chairs) that may be used along with EGMs, including, but not limited to, the new EGMs of the present disclosure.

Various embodiments of the present disclosure provide new gaming systems and methods of operating such new gaming systems that include an EGM and a gaming chair, including the one or more of the new EGMs and/or one or more of the new gaming chairs disclosed herein.

For brevity, the term "3D image(s)" used herein includes any 3D image or 3D images or other content shown in 3D such as but not limited to moving or transforming 3D geometries, 3D videos, or movies, etc.

As used herein, the terms "3D environment" or "3D world" may be used interchangeably. A 3D environment includes one or more visual aspects (e.g., one or more 3D images) and one or more audio aspects (e.g., a 3D audio space). Physical objects in the 3D image are referred to herein as virtual objects. Objects in the 3D audio space are referred to herein as virtual audio objects. In various instances, a virtual audio object in the 3D audio space corresponds to a virtual object in the 3D image. For example, a virtual object may be a bell, while the corresponding virtual audio object may be an audio file that corresponds to the "ringing" sound a bell makes. In various embodiments, the 3D environment may be represented as two separate virtual spaces (e.g., the one or more visual aspects and the one or more audio aspects) that overlap. In various embodiments, the one or more visual aspects may use a first coordinate system and the one or more audio aspects may use a second coordinate system. In certain such embodiments, software of the EGM when executed by the processor of the EGM compensates for the coordinate system(s). In certain embodiments, the first coordinate system and the second coordinate system may employ different scale factors, but generally overlap.

I. EGM—Stereo Ultrasound Speaker Configuration

Referring now to FIGS. 1 to 6, one example EGM of the present disclosure is generally illustrated and indicated by numeral 100. This example EGM 100 illustrated in FIGS. 1 to 6 generally includes a housing 200 (sometimes referred to herein as a "support structure" or a "cabinet") having a front side that supports a plurality output devices and a plurality of input devices of the EGM 100, among other components. In this example embodiment, the EGM 100 includes: (a) a first or intermediate display device 300 supported by the housing 200; (b) a head position tracker 320 supported by the housing 200; (c) a binaural audio system (not shown) supported by the housing 200; (d) a first ultrasound speaker 380 supported by the housing 1200; (e) a second ultrasound speaker 390 supported by the housing 200 and spaced apart from the first ultrasound speaker 380; and (f) a processor (not shown) and a memory device (not shown) that co-act or work together with the above-mentioned components to provide binaurally encoded stereo audio output (or transmitted) by ultrasound speakers having a stereo configuration. In this example embodiment, the first ultrasound speaker 380 and the second ultrasound speaker 390 are respectively positioned in a stereo configuration with respect to multiple different positions at which a player can be seated in front of the housing 200. As described in more detail below, the ultrasound speakers 380 and 390 output directional sound beams (e.g., at the respective ears of the player).

In this example embodiment, the first or intermediate display device 300, the head position tracker 320, the binaural audio system, the first ultrasound speaker 380, the second ultrasound speaker 390, the processor, and the memory device are configured to produce and output sound beams by operating in real-time or substantially real-time basis to: (a) cause the first or intermediate display device 300 to display a play of a game; (b) cause the first or intermediate display device 300 to display a 3D image to a player, wherein the 3D image includes a virtual object associated with 3D coordinates; (c) operate with the head position tracker 320 to capture player head position information; (d) cause the binaural audio system to generate a stereo binaural audio stream including encoded binaural information based on the captured player head position information and the 3D coordinates associated with the virtual object; (e) cause the first ultrasound speaker 380 to output a first sound beam based on the stereo binaural audio stream; and (f) cause the second ultrasound speaker 390 to output a second sound beam based on the stereo binaural audio stream. It should be appreciated that the processor and the memory device may be configured to operate with one or more sound cards (not shown) to cause the production and output of sound beams by the ultrasound speakers 380 and 390. In some embodiments, the processor and/or the memory device is integrated with the one or more sound cards. In some embodiments, the one or more sound cards are integrated with the first ultrasound speaker 380 and/or the second ultrasound speaker 390.

It should be appreciated that: (a) the first or intermediate display device 300; (b) the head position tracker 320; (c) the binaural audio system, (d) the first ultrasound speaker 380; and/or (e) the second ultrasound speaker 390, may each be individually configured or may alternatively be configured to operate with the processor and the memory device to provide each of their designated functions described herein. In other words: (a) the first or intermediate display device 300 may be individually configured to display images (e.g., 3D images) or may be configured to operate with the processor and the memory device to display images; (b) the head position tracker 320 may be individually configured to track the movement of the eyes and/or head of the player or may be configured to operate with the processor and the memory device to track the movement of the eyes and/or head of the player; (c) the binaural audio system may be individually configured to generate a stereo binaural audio stream or may be configured to operate with the processor and the memory device to generate a stereo binaural audio stream; (d) the first ultrasound speaker 380 may be individually configured to output the first sound beam or may be configured to operate with the processor and the memory device to output the first sound beam; and/or (e) the second ultrasound speaker 390 may be individually configured to output the second sound beam or may be configured to operate with the processor and the memory device to output the second sound beam. Thus, for purposes of this disclosure and for brevity, each of these devices are sometimes discussed as performing such tasks individually or operating with the processor and the memory device to perform such tasks, and such descriptions are not intended to limit the present disclosure to either configuration.

In this illustrated example embodiment, the plurality of output devices includes: (a) the first or intermediate display device 300; (b) a second or upper display device 400 positioned above the first or intermediate display device 300; and (c) a third or lower display device 500 positioned below the first or intermediate display device 300. These output devices 300, 400, and 500 are configured to display the game(s), game outcome(s), award(s) (such as the primary and/or secondary game award(s) or other game outcome award(s)), and/or other functionality and information to the player.

In this illustrated example embodiment, the plurality of player input devices enable the player to play one or more wager games provided by the EGM 100. Such player input devices can also include one or more input devices described below in the eighth (VIII) section of this detailed description. These player input devices are physically touchable or activatable by the player to enable the player to make inputs into the EGM 100. It should be appreciated that in certain embodiments, the player input devices are non-touch inputs, such as head trackers, eye gaze monitors, etc.

These output and input devices are configured such that a player may operate the EGM 100 while standing or sitting, but preferably operates with the EGM 100 while the player is sitting in front of the EGM 100 such that the player's head is approximately at the same height as the first display device 300.

In this illustrated example embodiment, the first display device 300 of the EGM 100 is configured to display one or more 3D images to the player without requiring the player to wear 3D glasses. For example, the first display device 300 includes one or more auto-stereoscopic displays (not shown). In various embodiments, the first display device 300 including the auto-stereoscopic display (e.g., lenticular lens or lenses) is configured to display or project what appears to the player as one or more 3D virtual objects (shown in FIG. 6) that are projected towards the player or projected in a player interaction zone in front of the player. In certain embodiments, the first display device 300 including the auto-stereoscopic display is configured to display or project what appears to the player as one or more 3D virtual objects that appear to the player to be behind the front face or screen of the first display device 300.

In certain embodiments, the player interaction zone extends in front of the first display device 300 in somewhat of a cone shape. However, it should be appreciated that in other embodiments, the player interaction zone can be alternatively configured, such as to extend: (a) from a horizontal plane level with a top edge of the first display device 300 to a horizontal plane level with a bottom edge of the first display device 300; (b) from a vertical plane level with a right side edge of the first display device 300 to a vertical plane level with a left side edge of the first display device 300; and (c) from a vertical plane from a front face of the first display device 300 to a vertical plane approximately twelve inches from the front surface of the first display device 300. In other embodiments, the player interaction zone can be alternatively configured to extend: (a) from a horizontal plane level with the top edge of the first display device 300 to a horizontal plane level with the bottom edge of the first display device 300; (b) from a vertical plane level with the right side edge of the first display device 300 to a vertical plane level with the left side edge of the first display device 300; and (c) from a vertical plane from the front face of the first display device 300 to vertical plane approximately twelve inches from the front surface of the first display device 300. It should thus be appreciated that the size and shape of the player interaction zone may vary in accordance with the present disclosure.

It should also be appreciated that the size and shape of the player interaction zone may vary as the position of the player's eyes or head change in accordance with the present disclosure. In certain such embodiments, the far end of the cone of the player interaction zone is centered at the player's eyes or head, and when the player's eyes or head move, the player interaction zone changes.

It should also be appreciated that other suitable 3D or virtual object displaying systems or devices can be employed in accordance with the present disclosure.

In this illustrated example embodiment, the head position tracker 320 of the EGM 100 is configured to track the movement of the eyes and/or the head of the player. The head position tracker 320 includes one or more eye tracking and/or head tracking cameras supported by the housing 200. In this illustrated example embodiment, the head position tracker 320 includes a camera that is positioned directly above the first display device 300.

Figure 4:
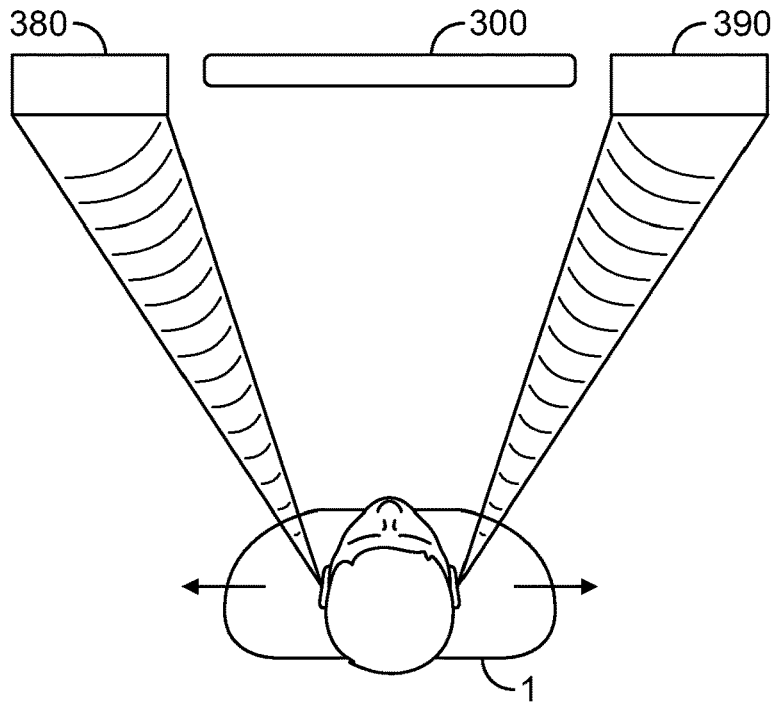
FIG. 4 is an enlarged diagrammatical top view of the central portion of the EGM of FIG. 1, depicting audio output from the ultrasonic speakers of the EGM based on a first player head position.
Figure 5:
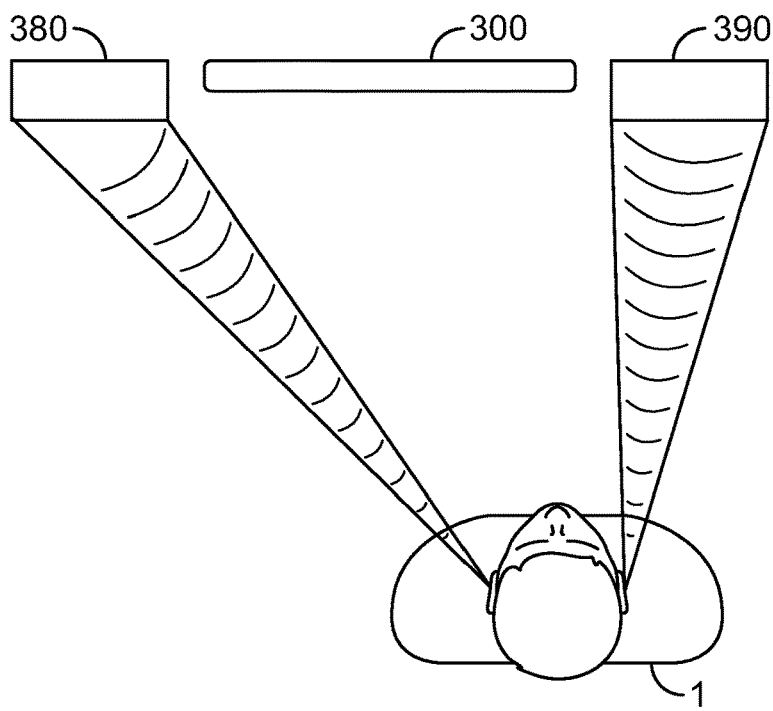
FIG. 5 is an enlarged diagrammatical top view of the central portion of the EGM of FIG. 1, depicting audio output from the ultrasonic speakers of the EGM based on a second different player head position.

The head position tracker 320 is configured to track the position of the player's eyes and/or the player's head as the player moves in front of the first display device 300 and thus in front of the housing 200. More specifically, the head position tracker 320 is configured to track the position of the player's eyes and/or the player's head as the player moves in, for example, an eye/head tracking zone in front of the EGM 100 (as illustrated in FIGS. 4 and 5). Other embodiments of the present disclosure include two or more eye tracking and/or head tracking cameras employed to work together to track the positions of the player's eyes and/or the player's head as the player moves in front of the first display device 300 and the housing 200. In various embodiments where two or more eye tracking and/or head tracking cameras are employed, such multiple cameras are spaced apart, such as spaced apart 6 inches.

In this illustrated example embodiment, the processor, the memory device, the head position tracker 320, and the first display device 300 of the EGM 100 align the coordinate system of the virtual display area (or world) with the real world by using player head position information (e.g., XYZ or 3D coordinates) obtained from the head position tracker 320. When the player moves their head around, the first display device 300 causes the virtual object(s) to appear to the player to stay in place where it is. Therefore, in this illustrated example embodiment, the EGM 100 uses the head position to fix the object(s) in space. The actual 2D stereo projection by the first display device 300 changes according to the head position, but to the player, the virtual object(s) appears or seems to stay where it is in the 3D image of the 3D environment.

The EGM 100 uses the coordinate system to determine in real-time, or substantially real-time, the position (e.g., XYZ coordinates) of the player's head relative to the front side of the housing 200 (sometimes referred to herein as "player head position" information). As described below, the EGM 100 uses the determined position of the player's head (e.g., the player head position information) to determine and specifically to generate the stereo binaural audio stream encoded with binaural information that is directionally output by the ultrasound speakers 380 and 390.

The first display device 300, the head position tracker 320, the one or more processor(s), and the one or more memory device(s) co-act or operate to track the player's eyes and/or head movements in an eye/head tracking zone in relation to the first display device 300 and the player interaction zone and to adjust the display or projection of each of the virtual object(s) in the player interaction zone based on the player eye and/or the player head movements.

In various embodiments, the first display device 300 adjusts the image(s) to be seen by the player's left and right eyes based on the determined position(s) and movement(s) of the player's eyes and/or player's head.

The auto-stereoscopic display facilitates the perception of two different images for the left and right eye of the player. In other words, the auto-stereoscopic display causes certain pixels of the screen to be visible only (or primarily only) to the player's right eye and certain other pixels of the screen to be visible only (or primarily only) to the left eye of the player. When the player's head position is changed (i.e., the player's viewing angle is changed), the first display device 300 also changes the pixel positions for the left eye and the right eye of the player. The head position or changes thereto determined by the head position tracker 320 are used by the EGM 100 to choose or select the correct pixels for the left eye and the right eye of the player.

Examples of the head position tracker 320, including an eye tracker or head tracker, are described in U.S. patent application Ser. No. 15/707,639, entitled "Electronic Gaming Machine and Method Providing Enhanced Physical Player Interaction," filed on Sep. 18, 2017.

It should also be appreciated that other suitable eye tracking or head tracking systems or devices can be employed in accordance with the present disclosure.

In this illustrated example embodiment, the EGM 100 includes a player hand position locator that is configured to track or determine the position(s) of at least one of the player's hands in front of the first display device 300 in right and/or left player hand tracking zones. In this illustrated example embodiment, the player hand position locator includes a plurality of cameras 330 and 340 supported by the housing 200 and positioned adjacent to the first display device 300. In this illustrated embodiment, a first camera 330 is positioned directly to the right of the first display device 300 (looking forward) and a second camera 340 positioned directly to the left of the first display device 300 (looking forward). In this illustrated embodiment, the first camera 330 is positioned adjacent to an upper right hand corner of the first display device 300 and the second camera 340 is positioned adjacent to an upper left hand corner of the first display device 300.

It should be appreciated that in an alternative embodiment, the plurality of cameras can be positioned adjacent to a lower right hand corner of the first display device 300 and positioned adjacent to a lower left hand corner of the first display device 300. It should be appreciated that in other alternative embodiments, the plurality of cameras can be otherwise alternatively positioned in accordance with the present disclosure. It should also be appreciated that in other alternative embodiments, the EGM can include only one such camera or more than two such cameras in accordance with the present disclosure. In certain embodiments, the player hand position locator is configured to locate part of the player's hand, such as one or more fingers. In certain embodiments, the player hand position locator is configured to simultaneously locate both of the player's hands or locate multiple parts of the player's hands, such as two or more fingers.

In certain embodiments, the cameras 330 and 340 include time of flight depth camera sensors positioned at the two opposite sides of the first display device 300 and focused inwardly somewhat towards each other. This configuration enables the cameras 330 and 340 to track objects, such as one or more of the player's hands in the relatively large right and left player hand tracking zones, respectively. These right and left player hand tracking zones overlap the player interaction zone. In certain embodiments, the time of flight depth camera sensors make the EGM less prone to occlusions. In certain embodiments, the time of flight depth cameras also deliver point clouds that can be quickly analyzed and used by the processor(s) to make the necessary determinations. It should be appreciated that other suitable depth sensors (other than time of flight sensors) may be employed in accordance with the present disclosure.

It should be appreciated that the cameras 330 and 340 may be a camera device and/or a non-camera device, including video sensors, image sensors, time-of-flight depth sensors, audio (or acoustic) sensors, capacitive sensors, ultrasound sensors, magnetic field sensors, radar sensors, and/or laser sensors to track the movement of the eyes and/or the head of the player 1.

In certain embodiments, the EGM 100 uses the image data provided by the cameras 330 and 340 to determine the position(s) of the player's hand(s) in the right and left player hand tracking zones and, thus, also in the player interaction zone. In certain embodiments, the EGM 100 creates the object depth images using point clouds provided by time of flight depth cameras and merges these point clouds to create one optimized point cloud that represents the object(s), such as the player's hand(s) in the right and/or left player hand tracking zones, and thus any portions thereof also in the player interaction zone and relative to the first display device 300. This provides a high degree of accuracy and a relatively large coverage area and player interaction zone (relative to a one camera system). In these embodiments, the EGM 100 determines in real time or substantially real time the position(s) (e.g., XYZ coordinates) of the object(s) such as the player's hand(s) in the player interaction zone, and uses the determined position(s) to generate the binaurally encoded stereo audio output by the ultrasound speakers 380 and 390. In certain embodiments, the EGM 100 uses the determined position(s) for providing binaurally encoded audio synced with 3D gestures to the player in real-time or substantially real-time.

Using these two cameras 330 and 340 and keeping the camera resolution relatively low: (a) facilitates an increased size of the player interaction zone; and (b) reduces the need for high data rates and significant processing time or delays for image analysis that may slow down the EGM 100 and prevent real time or substantially real time 3D audio feedback synced with 3D gestures. Using these two cameras 330 and 340 also better facilitates the tracking of multiple player hands.

In certain embodiments, the EGM uses the image data provided by the cameras 330 and 340 to determine the closest depth of the end of the player's hand(s) such as the end of one of the player's fingers that is in the player interaction zone closest to the first display device 300. In other words, in these alternative embodiments, the EGM determines the nearest point (e.g., an XYZ coordinate relative to the first display device 300) of the object such as the player's hand to the first display device 300, and then uses that point as the reference for providing binaurally encoded audio synced with the 3D gestures for the player in real-time or substantially real-time.

In certain embodiments, the EGM uses the image data provided by the cameras 330 and 340 to determine movements or gestures by the player's hand(s). In these embodiments, the EGM uses the determined gestures to provide the player binaurally encoded audio synced with the 3D gestures in real time or substantially real time.

In certain embodiments, the EGM includes one or more camera sync cables (not shown) that sync the multiple cameras 330 and 340 to enhance the accuracy of the determination of the position(s) of player's hand(s) in the right and left player hand tracking zones and in the player interaction zone. It should be appreciated that the image data from the multiple cameras can be synced in other suitable manners in accordance with the present disclosure.

Examples of player hand position locators are described in the U.S. patent application Ser. No. 15/707,639, entitled "Electronic Gaming Machine and Method Providing Enhanced Physical Player Interaction," filed on Sep. 18, 2017.

It should also be appreciated that other suitable player hand position locating systems or devices can be employed in accordance with the present disclosure.

For example, in various embodiments, the player hand position locator actually estimates the hand pose. The pose of the hand is not the position of the hand, but is instead the location and orientation of certain or every bone of the hand. In certain embodiments, the hand pose is determined by determining or specifying the 3D coordinates of a plurality of or every joint of the skeleton hand.

In the illustrated example embodiment, the binaural audio system of the EGM 100 is configured to produce and generate a stereo binaural audio stream encoded with binaural information. As disclosed below, the EGM 100 and/or the binaural audio system causes the ultrasound speakers 380 and 390 to output the generated stereo binaural audio stream. In this illustrated example embodiment, the binaural audio system includes an audio processing engine (not shown) to generate a dynamic surround audio file based on position information (e.g., XYZ coordinates) of virtual objects and virtual audio objects included in the 3D environment. The binaural audio system then processes the dynamic surround audio file and player head position information to generate the stereo binaural audio stream encoded with binaural information.

The present disclosure contemplates that the processing performed by the audio processing engine may be performed locally by the EGM 100, may be performed on an external computer (e.g., by an external audio processing engine), may be performed in a cloud, may be performed by a server-based system, may be performed by a series of digital signal processors, and/or may be performed by a series of graphics processing units.

In the illustrated example embodiment, the binaural audio system uses the audio processing engine to re-position audio objects in a 3D audio space based on the nearest point information provided by the EGM 100. For example, the audio processing engine updates (e.g., re-positions) the 3D position of an audio object in the 3D audio space based on the XYZ coordinates included in the nearest point information. For example, updating the 3D position of the virtual audio object may represent movement of the virtual object (e.g., a virtual bell) and the sound emitted from the virtual object also moving.

In the illustrated example embodiment, the binaural audio system uses the audio processing engine to process the audio objects included in the 3D audio space and a surround, multi-channel audio stream (e.g., a 5.1 channel surround sound stream, a 7.1 channel surround sound stream, etc.) to create a dynamic surround audio file. For example, the audio processing engine uses a quantity of virtual ambisonic microphones (e.g., 16 or more virtual ambisonic microphones) to process the virtual audio objects included in the 3D audio space to create the dynamic surround audio file. The audio processing engine may use various levels of ambisonics to produce positional information for the dynamic surround audio file. In certain embodiments, the audio processing engine combines the dynamic surround audio file with pre-rendered audio associated with the virtual audio objects in the 3D audio space.

In the illustrated example embodiment, the binaural audio system combines the dynamic surround audio file with the player head position information to create a stereo binaural audio stream including, at least, a right-ear audio signal and a left-ear audio signal.

The stereo binaural audio streams encoded with binaural information includes a first audio signal that is provided to the player's left ear and a second audio signal that is provided to the player's right ear. In certain embodiments, the stereo binaural audio streams encoded with binaural information may be output using headphones. However, the present disclosure enables providing (e.g., outputting) the stereo binaural audio streams encoded with binaural information without the player having to wear headphones. For example, the binaural audio system and/or the EGM 100 causes the first ultrasound speaker 380 to output a first sound beam based on the first audio signal in the direction of the player's left ear. The binaural audio system and/or the EGM 100 also causes the second ultrasound speaker 390 to output a second sound beam based on the second audio signal in the direction of the player's right ear. For example, the binaural audio system and/or the EGM 100 may use the player head position information to determine the location of the player's left ear and the player's right ear before causing the ultrasound speakers 380 and 390 to output the respective sound beams.

Figure 6:
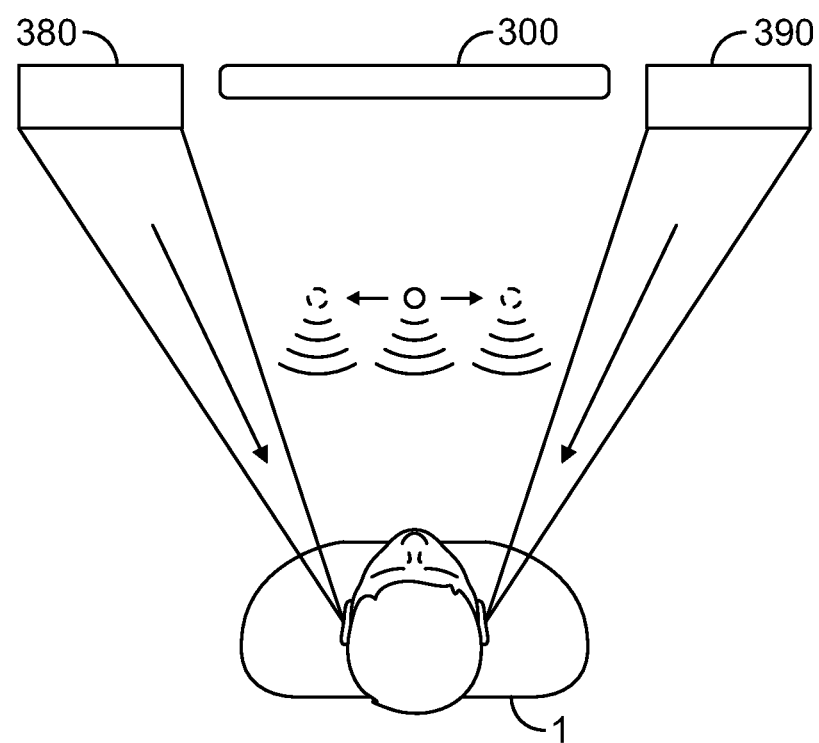
FIG. 6 is an enlarged fragmentary top view of the central portion of the EGM of FIG. 1, depicting a change in audio source location of the EGM based on a change in a position of a virtual object displayed by the EGM.

While the first audio signal and the second audio signal output to the two ears can be the same audio signal, the two audio signals can also be made to differ to create sound localization perceptions. For example, a particular sound can be provided to primarily only one ear (e.g., the right ear), causing that sound to be perceived by the player as if it had come from the direction of that ear (e.g., from the right-side of the player). For example, and as illustrated in FIG. 6, a virtual object may move from a relatively center position of the first display device 300 to a right-side of the first display device 300 or to a left-side of the first display device 300. In such embodiments, the audio processing engine updates the generated dynamic surround audio file based on the updated position information (e.g., XYZ coordinates) of the virtual object(s) and the virtual audio object(s) included in the 3D environment. The binaural audio system then processes the updated dynamic surround audio file along with any updated player head position information to generate an updated stereo binaural audio stream.

However, it should be appreciated that other signal processing techniques can also be used to generate, for example, a first audio signal and a second audio signal that, when heard together, exploit the brain's use of information, such as timing and amplitude differences between sounds heard at the two ears, to create the perception of sound being localized anywhere in a 2D or 3D space around the player as desired.

In the illustrated example embodiment, the EGM 100 then causes the ultrasound speakers 380 and 390 to output the right-ear audio signal and the left-ear audio signals as sound beams. In the illustrated example embodiment, the first ultrasound speaker 380 is suitably spaced apart from the second ultrasound speaker 390. In the illustrated example embodiment, the first ultrasound speaker 380 is positioned directly to the right of the first display device 300 (looking forward). The second ultrasound speaker 390 is positioned directly to the left of the first display device 300 (looking forward). That is, the ultrasound speakers 380 and 390 are positioned in a stereo configuration relative to the player standing or sitting in front of the EGM 100. For example, the EGM 100 causes the first ultrasound speaker 380 to output the right-ear audio signal as a first audio beam in the direction of the player's right ear. The EGM 100 also causes the second ultrasound speaker 390 to output the left-ear audio signal as a second audio beam in the direction of the player's left ear.

In this illustrated example embodiment, the ultrasound speakers 380 and 390 emit sound waves having frequencies above the audible frequency range (e.g., above 20 KHz). The ultrasound speakers 380 and 390 of this illustrated example embodiment each include one or more ultrasound transducers (i.e., the first ultrasound speaker 380 comprises a first plurality of ultrasound transducers and the second ultrasound speaker 390 comprises a second plurality of ultrasound transducers). The binaural audio system may cause a subset of the ultrasound transducers of the first ultrasound speaker 380 and/or the second ultrasound speaker 390 to output audio at different times. In this manner, the ultrasound sound beams output by the respective ultrasound speakers 380 and 390 may be directed at different positions by the binaural audio system and/or the EGM 100 in a controllable fashion. For example, the binaural audio system and/or the EGM 100 may cause certain of the ultrasound transducers of the first ultrasound speakers 380 and/or the second ultrasound speakers 390 to output ultrasound sound beams based on the location of the player's head and/or based on the location (e.g., coordinates) of a virtual object.

In this example embodiment, the EGM 100 utilizes signal propagation delays and/or level (e.g., volume) differences to account for the relative positions of the first ultrasound speaker 380, the second ultrasound speaker 390, and/or the player head position information. However, it should be appreciated that additional techniques for providing the player 1 with a uniform interaural experience (i.e., controlling for difference between the reception of the sound beams by each ear of the player 1 based on, for example, timing and intensity) may additionally or alternatively be used.

Referring now to FIGS. 4, 5, and 6, various examples of how the EGM can function to provide binaurally encoded stereo audio output (or transmitted) by ultrasound speakers having a stereo configuration are provided. It should be appreciated that the present disclosure is not limited to these examples, and that the EGM of the present disclosure can provide various types of binaurally encoded stereo audio.

FIGS. 4 and 5 illustrate one example operation of an EGM 100 (as shown in FIGS. 1 to 3 and 6) of one embodiment of the present disclosure. FIG. 4 shows the EGM 100 outputting binaurally encoded stereo audio via the ultrasound speakers 380 and 390 based on first player head position information. FIG. 5 shows the EGM 100 outputting binaurally encoded stereo audio via the ultrasound speakers 380 and 390 based on second different player head position information (e.g., after the player 1 moves).

For example, based on the first player head position information, the EGM 100 generates a first stereo binaural audio stream including a first left-ear audio signal and a first right-ear audio signal. The EGM 100 and/or the binaural audio system causes the first ultrasound speaker 380 to output a first sound beam based on the first left-ear audio signal in the direction of the player's left ear. The EGM 100 and/or the binaural audio system also causes the second ultrasound speaker 390 to simultaneously output a second sound beam based on the first right-ear audio signal in the direction of the player's right ear.

The EGM 100 then generates, based on the second player head position information, a second stereo binaural audio stream including a second left-ear audio signal and a second right-ear audio signal. The EGM 100 and/or the binaural audio system causes the first ultrasound speaker 380 to output a third sound beam based on the second left-ear audio signal in the direction of the player's left ear. The EGM 100 and/or the binaural audio system also causes the second ultrasound speaker 390 to simultaneously output a fourth sound beam based on the second right-ear audio signal in the direction of the player's right ear.

In this illustrated example embodiment, the directions that the first sound beam, the second sound beam, the third sound beam, and the fourth sound beam are output by the EGM 100 are each different directions. However, it should be appreciated that in certain embodiments, the direction of two or more of the sound beams output by the EGM 100 may be the same.

In certain embodiments, the EGM 100 adjusts the intensity (e.g., volume) of the sound beams based on the player head position information. For example, and referring to FIG. 5, the EGM 100 may decrease the intensity level of the fourth sound beam output by the second ultrasound speaker 390 because the position of the player head is relatively closer to the second ultrasound speaker 390 than the first ultrasound speaker 380. Additionally or alternatively, the EGM 100 may increase the intensity level (e.g., volume) of the third sound beam output by the first ultrasound speaker 390 because the position of the player head is relatively farther from the first ultrasound speaker 380 than the second ultrasound speaker 390.

FIG. 6 illustrates another example operation of EGM 100 (as shown in FIGS. 1 to 5) of one embodiment of the present disclosure. FIG. 6 shows that virtual objects displayed by the EGM 100 may move (or change positions). In the illustrated example embodiment, the virtual object (e.g., a virtual ball) is initially positioned in a relatively center position of the first display device 300. The virtual object may then move to a relatively left-of-center position of the first display device 300 and/or to a relatively right-of-center position of the first display device 300. In the illustrated example embodiment, the EGM 100 updates the dynamic surround audio file based on the movement of the virtual object. The EGM 100 then updates the stereo binaural audio stream based on the updated dynamic surround audio file.

Although not shown, it should be appreciated that in certain embodiments, the EGM 100 may update the stereo binaural audio based on an updated dynamic surround audio file and updated player head position information. For example, the player 1 may move their head to a relatively right-of-center position of the first display device 300 to avoid a virtual ball being "thrown" at them from a relatively left-of-center position of the first display device 300. In certain such embodiments, the EGM 100 (e.g., the audio processing engine) generates an updated dynamic surround audio file to account for the change in position of the virtual ball. The EGM 100 (e.g., the binaural audio system) then generates an updated stereo binaural audio stream encoded with binaural information based on the updated dynamic surround audio file and the change in position of the player head.

Although not shown, it should be appreciated that in certain embodiments, the EGM 100 may additionally or alternatively include an ultrasound speaker array including a plurality of transducers. For example, the EGM 100 may include the first ultrasound speaker 380 and the second ultrasound speaker 390 (as described above), may include the ultrasound speaker array, or may include the first ultrasound speaker 380, the second ultrasound speaker 390, and the ultrasound speaker array.

In some embodiments, the ultrasound speaker array may be supported by the housing 200 and positioned directly above the first display device 300. However, it should be appreciated that the ultrasound speaker array may be positioned at other suitable positions relative to the front of the housing 200 to enable the plurality of transducers of the ultrasound speaker array to produce and output sound beams in the direction of the player 1.

The EGM 100 may activate a first subset of the transducers to facilitate a first stereo channel (e.g., a right-channel). The EGM 100 may simultaneously active a second subset of the transducers to facilitate a second stereo channel (e.g., a left-channel). In some such embodiments, the first subset of transducers of the ultrasound speaker array may operate as the first ultrasound speaker 380 to output a first sound beam associated with a first audio signal of the stereo binaural audio stream in the direction of the player 1, as described above. Likewise, the second subset of transducers of the ultrasound speaker array may operate as the second ultrasound speaker 390 to output a second sound beam associated with a second audio signal of the stereo binaural audio stream in the direction of the player 1, as described above.

In some embodiments, the ultrasound speaker array includes the first ultrasound speaker 380 and the second ultrasound speaker 390.

II. Example Method

Figure 7:
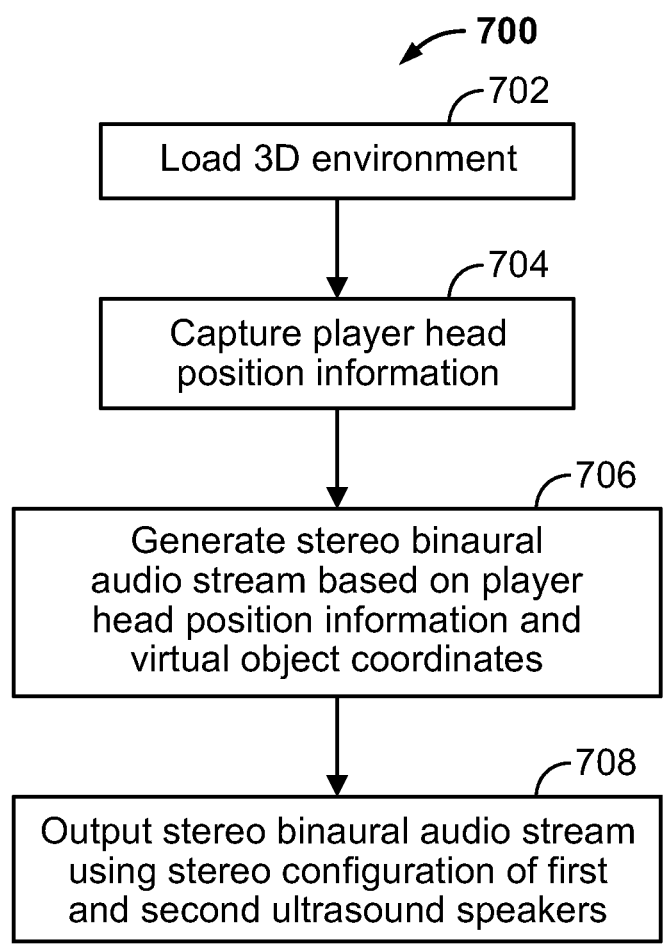
FIG. 7 is a flowchart of an example method of operating the EGM of FIG. 1 to provide one example embodiment of facilitating a stereo ultrasonic speaker configuration of the present disclosure.

FIG. 7 is a flowchart of an example process or method 700 of one example embodiment of the present disclosure that generates and outputs a stereo binaural audio stream encoded with binaural information using ultrasound speakers in a stereo configuration. In various embodiments, the process 700 is represented by a set of instructions stored in one or more memories and executed by one or more processors. Although the process 700 is described with reference to the flowchart in FIG. 7, it should be appreciated that many other processes of performing the acts associated with this illustrated process of FIG. 7 may be employed. For example, the order of certain of the illustrated blocks and/or diamonds may be changed, certain of the illustrated blocks and/or diamonds may be optional, and/or certain of the illustrated blocks and/or diamonds may not be employed.

In operation of this example embodiment, the process 700 of FIG. 7 begins, as indicated by block 702, when a game engine (sometimes referred to as a "gaming system" or EGM) loads data corresponding to the 3D environment. For example, the game engine may load information related to the background, 3D meshes, textures, game logic, etc. As shown in FIG. 6, the game engine loads a 3D environment including a virtual ball.

As indicated by block 704, the gaming system captures player head position information of the player 1. For example, the player head tracker 320 captures player head position information that includes XYZ coordinate positions of the head of the player 1 while the player 1 is positioned relative to the EGM 100.

As indicated by block 706, the binaural audio system generates the stereo binaural audio stream based on the player head position information and virtual object coordinates. For example, the audio processing engine processes the audio objects included in the 3D audio space of the 3D environment, and a surround, multi-channel audio stream to create (e.g., generate) the dynamic surround audio file. The binaural audio system then combines the dynamic surround audio file with and the XYZ coordinate positions of the head of the player 1 (including XYZ coordinate positions of the left ear of the player 1 and the right ear of the player 1) to generate the stereo binaural audio stream. In this example embodiment, the stereo binaural audio stream includes a right-ear audio signal and a left-ear audio signal.

As indicated by block 708, the EGM 100 then causes the ultrasound speakers to output the stereo binaural audio stream. For example, the EGM 100 and/or the binaural audio system causes the first ultrasound speaker 380 to output a first sound beam associated with the right-ear audio signal of the stereo binaural audio stream in the direction of the right-ear of the player 1. The EGM 100 and/or the binaural audio system simultaneously causes the second ultrasound speaker 390 to output a second sound beam associated with the left-ear audio signal of the stereo binaural audio stream in the direction of the left-ear of the player 1.

It should be appreciated that the process 700 may return to block 702 to load an updated 3D environment or may return to block 704 to updated player head position information so that the sound beams output by the ultrasound speakers 380 and 390 can be updated to adjust for any change in positioning of the head of the player 1 (e.g., movement of the player head).

In certain such embodiments, the EGM 100 may then create updated stereo binaural audio streams based on updated player head position information. For example, and as illustrated in FIGS. 4 and 5, as the player 1 moves their head from a first position (e.g., as indicated in FIG. 4) to a second position (e.g., as indicated in FIG. 5), the EGM 100 captures first player head position information associated with the first position of the head of the player 1 and captures second player head position information associated with the second position of the head of the player 1. The EGM 100 generates an updated stereo binaural audio stream for based on the second player head position information. The EGM 100 then updates the directions of the first and second sound beams output by the ultrasound speakers 380 and 390 so that the player head is best covered by sound beams output by the first ultrasound speaker 380 and the second ultrasound speaker 390.

III. EGM—Combining Ultrasound Speakers and Non-Ultrasound Speakers to Output Binaurally Encoded Surround Audio Referring now to FIG. 8, another example EGM of the present disclosure is generally illustrated and indicated by numeral 1100. This example EGM 1100 illustrated in FIG. 8 generally includes a housing 1200 having a front side that supports a plurality of output devices and a plurality of input devices of the EGM 1100, among other components. The example EGM 1100 also includes a hood 1700 extending from the top of the housing 1200. In this example embodiment, the EGM 1100 includes: (a) a first or intermediate display device 1300 supported by the housing 1200; (b) a head position tracker 1320 supported by the housing 1200; (c) a binaural audio system (not shown) supported by the housing 1200; (d) a first ultrasound speaker 1380 supported by the housing 1200; (e) a second ultrasound speaker 1390 supported by the housing 1200; (f) a speaker array 1600 supported by the housing 1200; (g) a subwoofer 1650 supported by the housing 1200; (h) an ultrasound speaker array 1710 supported by the hood 1700; (i) a third ultrasound speaker 1750 supported by the hood 1700; and (j) a processor (not shown) and a memory device (not shown) that co-act or work together with the above-mentioned components to provide binaurally encoded surround audio output (or transmitted) by ultrasound speakers and non-ultrasound speakers. In this example embodiment, the first ultrasound speaker 1380 and the second ultrasound speaker 1390 are respectively positioned in a stereo configuration with respect to a position at which a player can be seated in front of the housing 1200. In this example embodiment, the speaker array 1600 includes a plurality of speakers (not individually shown). In this example embodiment, the ultrasound speaker array 1710 includes a plurality of ultrasound speakers (not individually shown).

In this example embodiment, the first or intermediate display device 1300, the head position tracker 1320, the first ultrasound speaker 1380, the second ultrasound speaker 1390, the speaker array 1600, the subwoofer 1650, the ultrasound speaker array 1710, the third ultrasound speaker 1750, the processor, and the memory device are configured to produce and output sound beams by operating in real-time or substantially real-time to: (a) cause the first or intermediate display device 1300 to display a play of a game; (b) cause the first or intermediate display device 1300 to display a 3D image to a player, wherein the 3D image includes a virtual object associated with 3D coordinates; (c) operate with the head position tracker 1320 to capture player head position information; (d) cause the binaural audio system to generate a surround binaural audio stream including encoded binaural information based on the captured player head position information and the 3D coordinates associated with the virtual object; (e) cause the first ultrasound speaker 1380 to output a first sound beam based on the surround binaural audio stream; (f) cause the second ultrasound speaker 1390 to output a second sound beam based on the surround binaural audio stream; (g) cause the speaker array 1600 to output a third sound beam based on the surround binaural audio stream; (h) cause the subwoofer 1650 to output a fourth sound beam based on the surround binaural audio stream; (i) cause the ultrasound speaker array 1710 to output a fifth sound beam based on the surround binaural audio stream; and (j) cause the third ultrasound speaker 1750 to output a sixth sound beam based on the surround binaural audio stream.

It should be appreciated that the processor and the memory device may be configured to operate with one or more sound cards to cause the production and output of sound beams by the first ultrasound speaker 1380, the second ultrasound speaker 1390, the speaker array 1600, the subwoofer 1650, the ultrasound speaker array 1710, and the third ultrasound speaker 1750. In some embodiments, the processor and/or the memory device is integrated with the one or more sound cards. In some embodiments, the one or more sound cards are integrated with the first ultrasound speaker 1380, the second ultrasound speaker 1390, the speaker array 1600, the subwoofer 1650, the ultrasound speaker array 1710, and/or the third ultrasound speaker 1750.

It should be appreciated that in certain embodiments, the processor and the memory device may be configured to operate without a sound card to cause the production and output of sound beams by the first ultrasound speaker 1380, the second ultrasound speaker 1390, the speaker array 1600, the subwoofer 1650, the ultrasound speaker array 1710, and the third ultrasound speaker 1750.

In this illustrated example embodiment, and similar to the EGM 100 of FIGS. 1 to 6, the plurality of output devices of the EGM 1100 includes: (a) the first or intermediate display device 1300; (b) a second or upper display device 1400 positioned above the first or intermediate display device 1300; and (c) a third or lower display device 1500 positioned below the first or intermediate display device 1300.

In this illustrated example embodiment, and similar to the EGM 100 of FIGS. 1 to 6, the plurality of player input devices enable the player to play one or more wager games provided by the EGM 1100.

In this illustrated example embodiment, the first display device 1300 of the EGM 1100 is configured to display one or more 3D images to the player without requiring the player to wear 3D glasses. The first display device 1300 of the EGM 1100 operates similar to the first display device 300 of the EGM 100 and, thus, is not described in more detail in this section.

In this illustrated example embodiment, the head position tracker 1320 of the EGM 1100 is configured to track the movement of the eyes and/or the head of the player 1. The head position tracker 1320 of the EGM 1100 operates similar to the head position tracker 320 of the EGM 100 and, thus, is not described in more detail in this section.

In the illustrated example embodiment, the binaural audio system of the EGM 1100 is configured to produce and generate a surround binaural audio stream encoded with binaural information that is output by the ultrasound speakers 1380, 1390, and 1750, the speaker array 1600, the subwoofer 1650, and the ultrasound speaker array 1710. As disclosed below, the EGM 1100 and/or the binaural audio system causes the ultrasound speakers 1380, 1390, and 1750, the speaker array 1600, the subwoofer 1650, and the ultrasound speaker array 1710 to output the generated surround binaural audio stream.

In this illustrated example embodiment, and similar to the EGM 100 of FIGS. 1 to 6, the binaural audio system of the binaural audio system includes an audio processing engine (not shown) to generate a dynamic surround audio file based on position information (e.g., XYZ coordinates) of virtual objects and virtual audio objects included in the 3D environment. In this example embodiment, the audio processing engine combines the position information (e.g., XYZ coordinates) of virtual objects and virtual audio objects in the 3D environment with a surround, multi-channel audio stream (e.g., a 5.1 channel surround sound stream, a 7.1 channel surround sound stream, etc.) to create the dynamic surround audio file. By using the surround, multi-channel audio stream, the dynamic surround audio file includes various components (e.g., audio signals) that can be output by the ultrasound speakers 1380, 1390, and 1750, the speaker array 1600, the subwoofer 1650, and the ultrasound speaker array 1710 to create an enhanced surround sound experience for the player.

In this illustrated example embodiment, the binaural audio system processes the dynamic surround audio file and player head position information to generate the surround binaural audio stream encoded with binaural information. In the illustrated example embodiment, the binaural audio system combines the dynamic surround audio file with the player head position information to create the surround binaural audio stream including, at least, a right-ear audio signal and a left-ear audio signal. In this illustrated example embodiment, the surround binaural audio stream also includes additional audio signals based on the surround, multi-channel audio stream used by the audio processing engine to generate the dynamic surround audio file. For example, the surround binaural audio stream may include a left channel audio signal, a right channel audio signal, a subwoofer channel audio signal, a center channel audio signal, a center-left channel audio signal, a center-right channel audio signal, etc.

In this illustrated example embodiment, the first ultrasound speaker 1380 of the EGM 1100 is configured to output a first sound beam in the direction of the player 1 and the second ultrasound speaker 1390 of the EGM 1100 is configured to output a second sound beam in the direction of the player 1. The first and second ultrasound speakers 1380 and 1390 of the EGM 1100 operate similar to the first and second ultrasound speakers 380 and 390 of the EGM 100 and, thus, are not described in more detail in this section. For example, the EGM 1100 causes the first ultrasound speaker 1380 to output the right channel audio signal as a first audio beam in the direction of the player's right ear. The EGM 1100 causes the second ultrasound speaker 1390 to simultaneously output a left channel audio signal as a second audio beam in the direction of the player's left ear.

In this illustrated example embodiment, the speaker array 1600 of the EGM 1100 is configured to output a third sound beam of the surround binaural audio stream. The speaker array 1600 is configured to output sound beams in an audible frequency range. For example, in certain embodiments, the upper frequency limit of the plurality of speakers included in the speaker array 1600 may be around 20 KHz, which is generally accepted as about the highest frequency audible to the human ear. In certain embodiments, the lower frequency limit of the plurality of speakers included in the speakers array 1600 may be around 20 Hz, which is generally accepted as about the lowest frequency audible to the human ear. However, it should be appreciated that any suitable audible frequency range may be used. In certain embodiments, the plurality of speakers of the speaker array 1700 may be configured to output sound only in a subset of the audible frequencies, and any suitable subset may be chosen.

In this illustrated example embodiment, the subwoofer 1650 of the EGM 1100 is configured to output a fourth sound beam based on the surround binaural audio stream. The subwoofer 1650 is configured to output audio beams in a low frequency range. For example, the subwoofer 1650 may output audio signals in a frequency range of 20 Hz to 200 Hz. In this illustrated example embodiment, the subwoofer 1650 outputs audio signals included in the surround binaural audio stream that are in the low frequency range. For example, the subwoofer 1650 may output sound beams based on the subwoofer channel audio signal of the surround binaural audio stream.

In this illustrated example embodiment, the ultrasound speaker array 1710 of the EGM 1100 is configured to output a fifth sound beam based on the surround binaural audio stream. The ultrasound speaker array 1710 includes a plurality of ultrasound speakers, such as the ultrasound speakers 380 and 390 of the EGM 100 of FIG. 1. In this illustrated example embodiment, the ultrasound speaker array 1710 includes a linear array of ultrasound speakers. In certain embodiments, a subset of the ultrasound speakers of the ultrasound speaker array 1710 may output sound beams. In certain embodiments, one or more of the plurality of ultrasound speakers of the ultrasound speaker array 1710 may be angled in different directions to direct sound beams in the respective directions. For example, a first subset of the ultrasound speakers of the ultrasound speaker array 1710 may be positioned to output sound beams downward toward the player 1, while a second subset of the ultrasound speakers of the ultrasound speaker array 1710 may be positioned to output sound beams away from the player 1 (e.g., over the head of the player 1, to the left of player 1, to the right of player 1, etc.).

In this illustrated example embodiment, the ultrasound speaker array 1710 outputs sound beams based on audio signals included in the surround binaural audio stream. In certain embodiments, sound beams output by the ultrasound speaker array 1710 are directed at the player 1. For example, the sound beams output by the ultrasound speaker array 1710 may be part of the surround sound experience being provided to the player 1 by the EGM 1100.

In certain embodiments, sound beams output by the ultrasound speaker array 1710 may be directed away from the player. For example, the sound beams output by the ultrasound speaker array 1710 may be directed at audience members who are standing near and/or far from the EGM 1100. These types of sound beams may be intended to attract audience members to the EGM 1100.

In this illustrated example embodiment, the third ultrasound speaker 1750 of the EGM 1100 is configured to output a sixth sound beam based on the surround binaural audio stream. The third ultrasound speaker 1750 of the EGM 1100 operates similar to the first and second ultrasound speakers 380 and 390 of the EGM 100 and, thus, is not described in more detail in this section.

In certain embodiments, one or more of the sound beams output by the EGM 1100 may be based on the same audio signal of the surround binaural audio stream.

Figure 9:
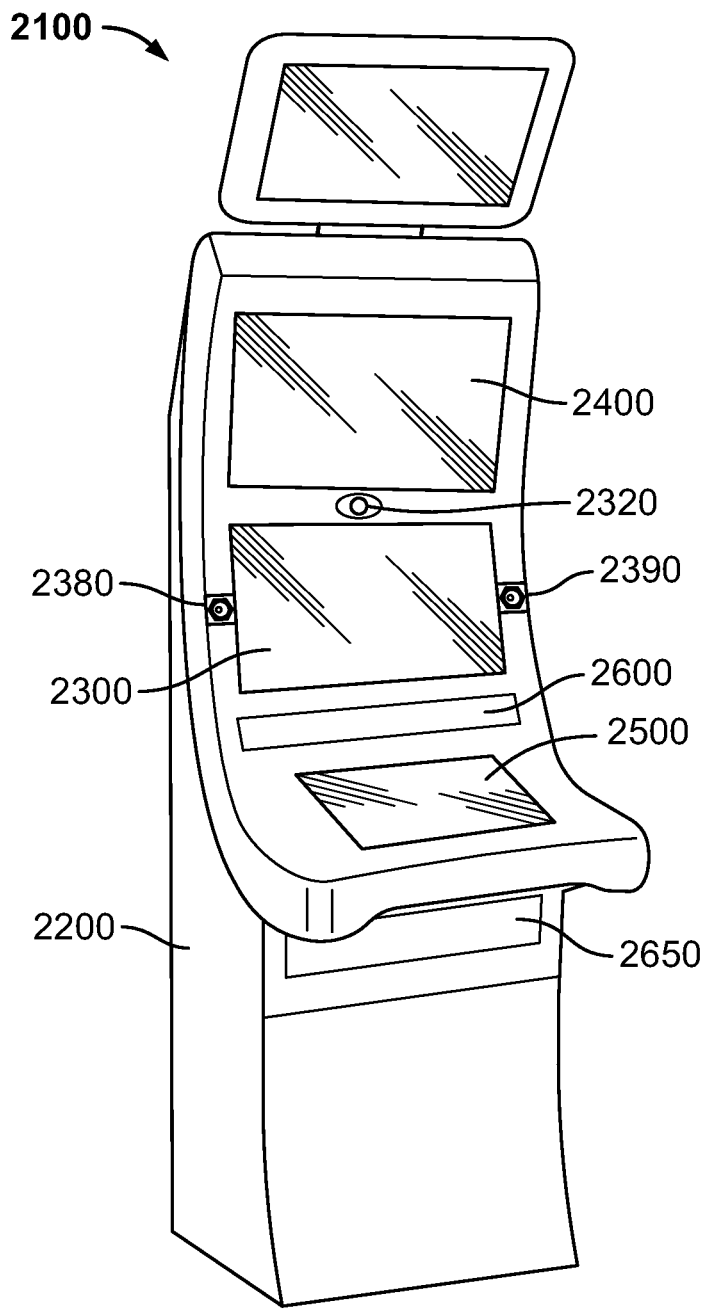
FIG. 9 is a front perspective view of another example embodiment of an EGM of the present disclosure.

IV. EGM—Combining Ultrasound Speakers and Non-Ultrasound Speakers to Output Binaurally Encoded Surround Audio Referring now to FIG. 9, another example EGM of the present disclosure is generally illustrated and indicated by numeral 2100. This example EGM 2100 illustrated in FIG. 9 generally includes a housing 2200 having a front side that supports a plurality of output devices and a plurality of input devices of the EGM 2100, among other components. In this example embodiment, the EGM 2100 includes: (a) a first or intermediate display device 2300 supported by the housing 2200; (b) a head position tracker 2320 supported by the housing 2200; (c) a binaural audio system (not shown) supported by the housing 2200; (d) a first ultrasound speaker 2380 supported by the housing 2200; (e) a second ultrasound speaker 2390 supported by the housing 2200, (f) a speaker array 2600 supported by the housing 2200; (g) a subwoofer 2650 supported by the housing 1200; and (h) a processor (not shown) and a memory device (not shown) that co-act or work together with the above-mentioned components to provide binaurally encoded surround audio output (or transmitted) by ultrasound speakers and non-ultrasound speakers. In this example embodiment, the first ultrasound speaker 2380 and the second ultrasound speaker 2390 are respectively positioned in a stereo configuration with respect to a position at which a player can be seated in front of the housing 2200. In this example embodiment, the speaker array 2600 includes a plurality of speakers.

In this example embodiment, the first or intermediate display device 2300, the head position tracker 2320, the first ultrasound speaker 2380, the second ultrasound speaker 2390, the speaker array 2600, the subwoofer 2650, the processor, and the memory device are configured to produce and output sound beams by operating in real-time or substantially real-time to: (a) cause the first or intermediate display device 2300 to display a play of a game; (b) cause the first or intermediate display device 2300 to display a 3D image to a player, wherein the 3D image includes a virtual object associated with 3D coordinates; (c) operate with the head position tracker 2320 to capture player head position information; (d) cause the binaural audio system to generate a surround binaural audio stream including encoded binaural information based on the captured player head position information and the 3D coordinates associated with the virtual object; (e) cause the first ultrasound speaker 2380 to output a first sound beam based on the surround binaural audio stream; (f) cause the second ultrasound speaker 2390 to output a second sound beam based on the surround binaural audio stream; (g) cause the speaker array 2600 to output a third sound beam based on the surround binaural audio stream; and (h) cause the subwoofer 2650 to output a fourth sound beam based on the surround binaural audio stream.

It should be appreciated that the processor and the memory device may be configured to operate with one or more sound cards to cause the production and output sound beams by the first ultrasound speaker 2380, the second ultrasound speaker 2390, the speaker array 2600, and the subwoofer 2650. In some embodiments, the processor and/or the memory device is integrated with the one or more sound cards. In some embodiments, the one or more sound cards are integrated with the first ultrasound speaker 2380, the second ultrasound speaker 2390, the speaker array 2600, and the subwoofer 2650.

Figure 8:
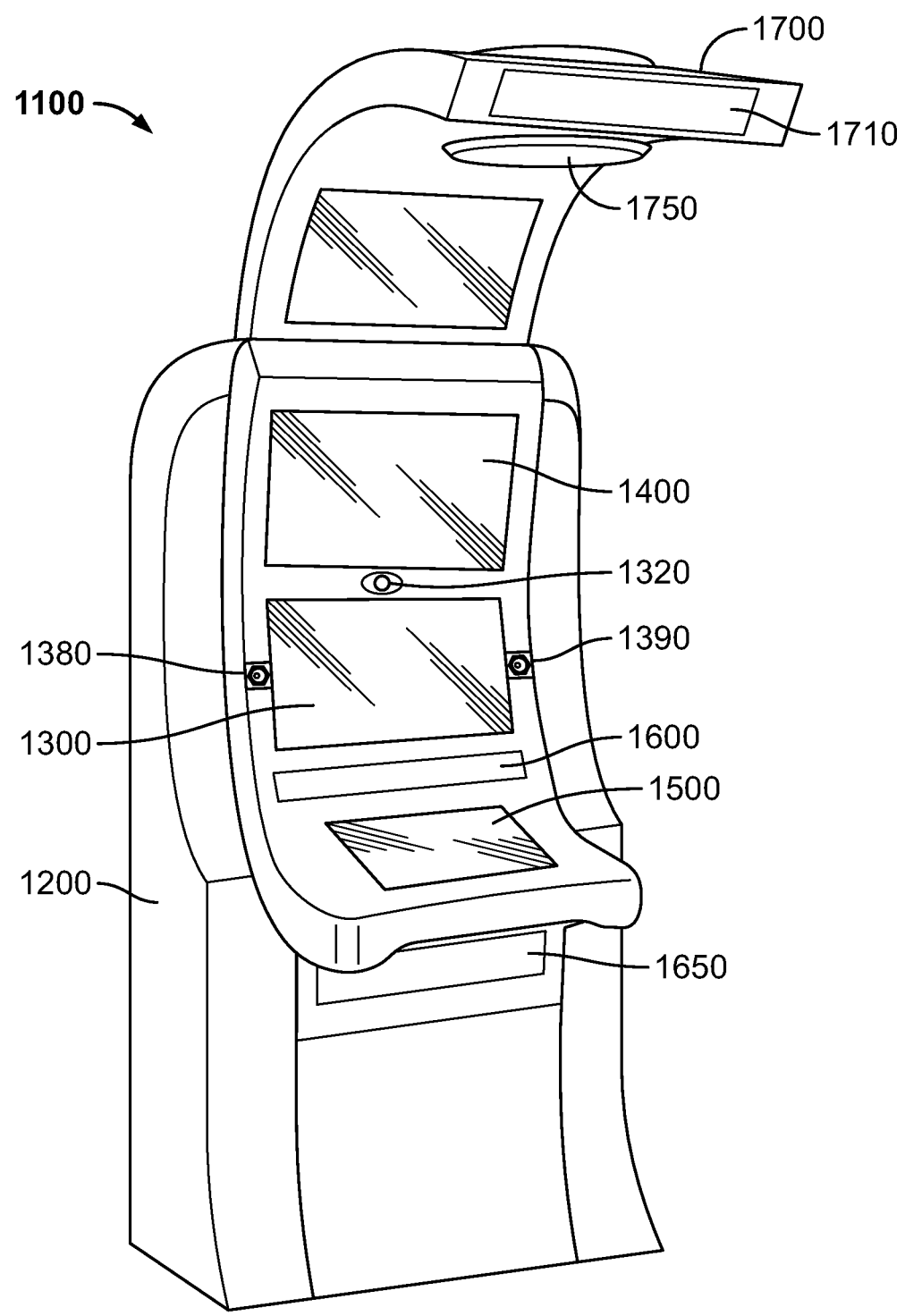
FIG. 8 is a front perspective view of another example embodiment of an EGM of the present disclosure.

In this illustrated example embodiment, and similar to the EGM 100 of FIGS. 1 to 6 and to the EGM 1100 of FIG. 8, the plurality of output devices of the EGM 2100 includes: (a) the first or intermediate display device 2300; (b) a second or upper display device 2400 positioned above the first or intermediate display device 2300; and (c) a third or lower display device 2500 positioned below the first or intermediate display device 2300.

In this illustrated example embodiment, and similar to the EGM 100 of FIGS. 1 to 6 and to the EGM 1100 of FIG. 8, the plurality of player input devices enable the player to play one or more wager games provided by the EGM 2100.

In this illustrated example embodiment, the first display device 2300 of the EGM 2100 is configured to display one or more 3D images to the player without requiring the player to wear 3D glasses. The first display device 2300 of the EGM 2100 operates similar to the first display device 300 of the EGM 100 and, thus, is not described in more detail in this section.

In this illustrated example embodiment, the head position tracker 2320 of the EGM 2100 is configured to track the movement of the eyes and/or the head of the player 1. The head position tracker 2320 of the EGM 2100 operates similar to the head position tracker 320 of the EGM 100 and, thus, is not described in more detail in this section.

In the illustrated example embodiment, the binaural audio system of the EGM 2100 is configured to produce and generate a surround binaural audio stream encoded with binaural information that is output by the ultrasound speakers 2380 and 2390, the speaker array 2600, and the subwoofer 2650. The binaural audio system of the EGM 2100 operates similar to the binaural audio system of the EGM 1100 of FIG. 8 and, thus, is not described in more detail in this section.

In this illustrated example embodiment, the first ultrasound speaker 2380 of the EGM 2100 is configured to output a first sound beam in the direction of the player 1 and the second ultrasound speaker 2390 of the EGM 2100 is configured to output a second sound beam in the direction of the player 1. The first and second ultrasound speakers 2380 and 2390 of the EGM 2100 operate similar to the first and second ultrasound speakers 380 and 390 of the EGM 100 and, thus, are not described in more detail in this section.

In this illustrated example embodiment, the speaker array 2600 of the EGM 2100 is configured to output a third sound beam of the surround binaural audio stream. The speaker array 2600 of the EGM 2100 operate similar to the speaker array 1600 of the EGM 1100 and, thus, is not described in more detail in this section.

In this illustrated example embodiment, the subwoofer 2650 of the EGM 2100 is configured to output a fourth sound beam based on the surround binaural audio stream. The subwoofer 2650 of the EGM 2100 operate similar to the subwoofer 1650 of the EGM 1100 and, thus, is not described in more detail in this section.

V. Electronic Gaming System—EGM and Gaming Chair

Figure 10:
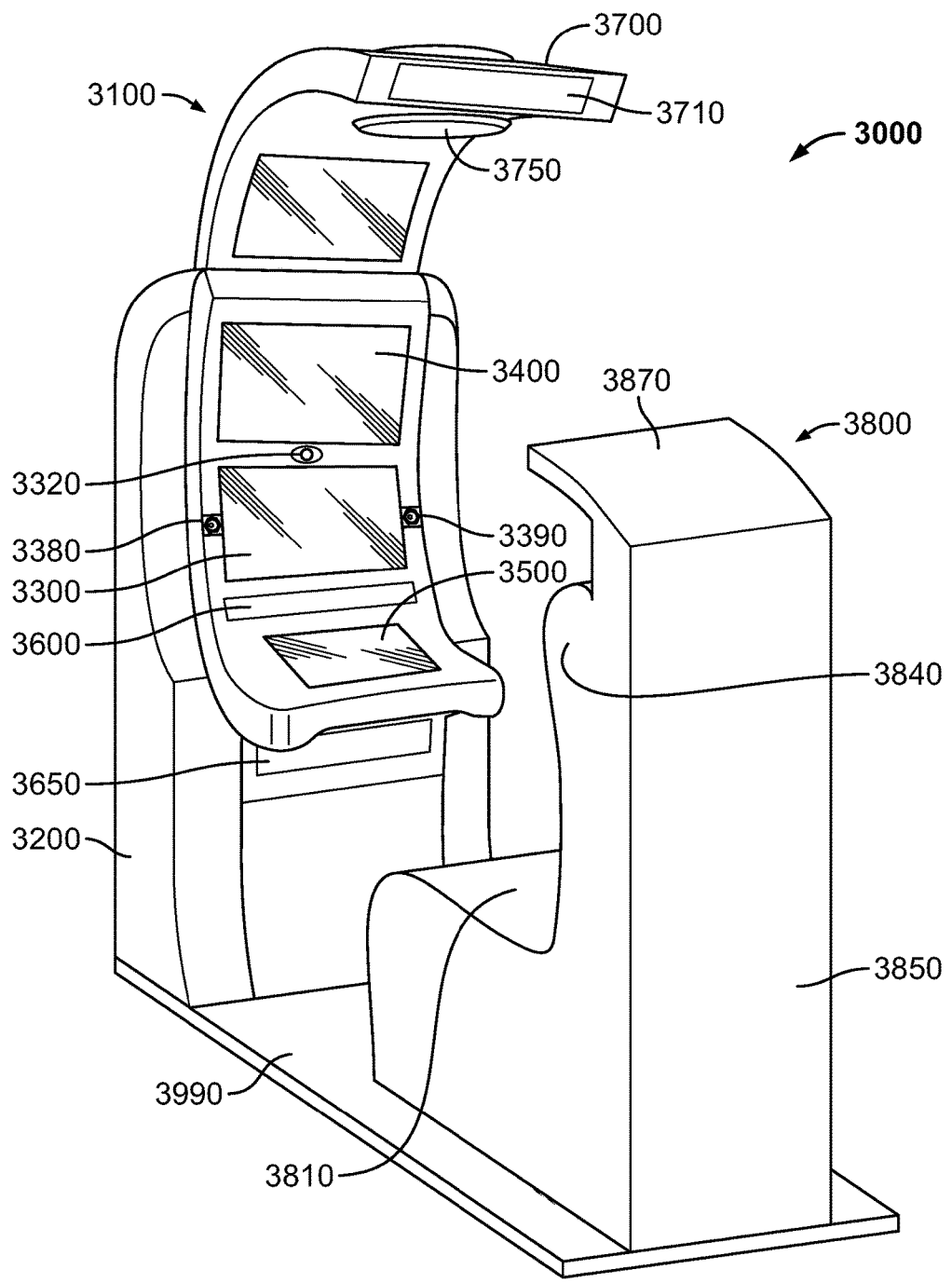
FIG. 10 is a front perspective view of the example EGM of FIG. 8 and a an example gaming chair of one embodiment of the present disclosure.
Figure 11:
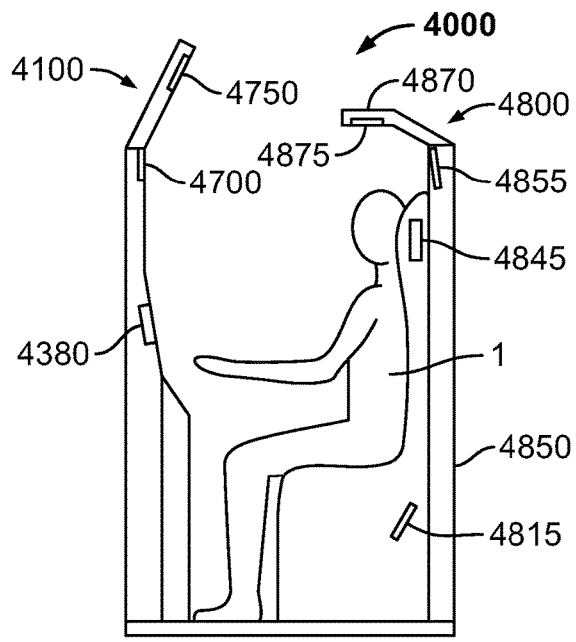
FIG. 11 is a side view of the EGM and the gaming chair of FIG. 10.
Figure 12:
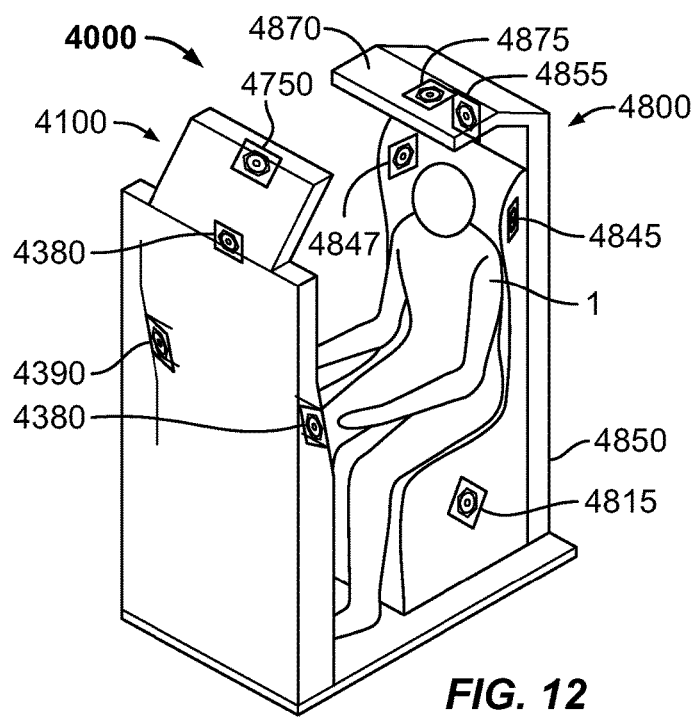
FIG. 12 is a back perspective view of the EGM and the gaming chair of FIG. 10.
Figure 13:
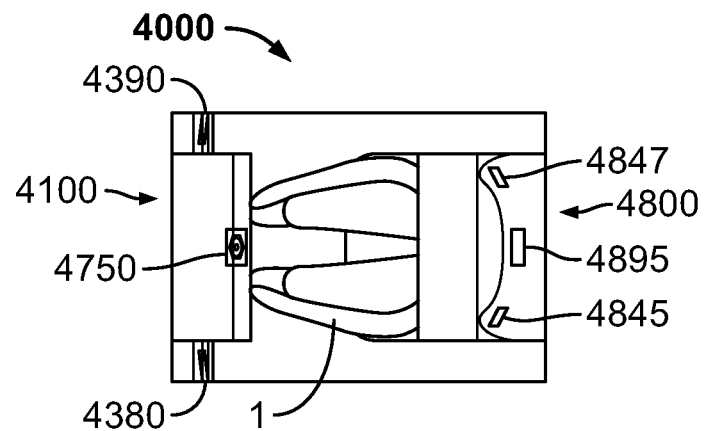
FIG. 13 is a top view of the EGM and the gaming chair of FIG. 10.
Figure 14:
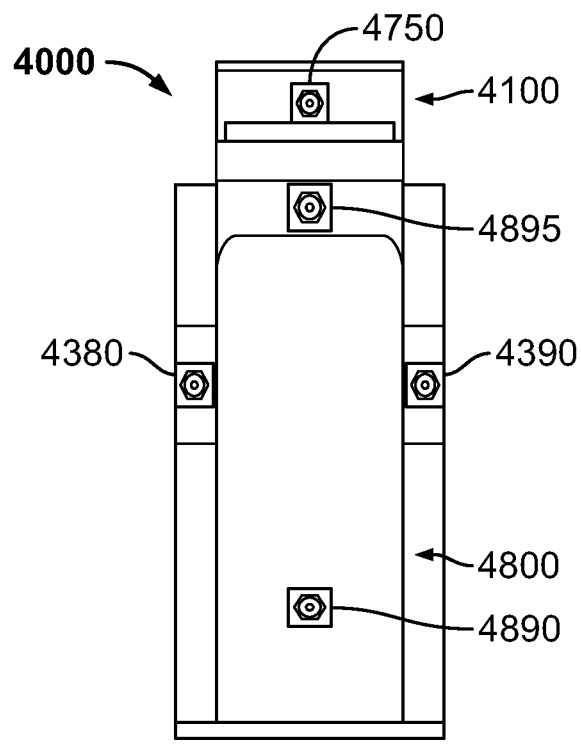
FIG. 14 is a front view of the gaming chair of FIG. 10 from behind the gaming chair.

Referring now to FIG. 10, an example electronic gaming system of the present disclosure is generally illustrated and indicated by numeral 3000. This example electronic gaming system 3000 illustrated in FIG. 10 generally includes an EGM 3100 having a housing 3200 and a hood 3700 extending from the top of the housing 3200. The electronic gaming system 3000 also includes a gaming chair 3800.

In this example embodiment, the EGM 3100 includes: (a) a first or intermediate display device 3300 supported by the housing 3200; (b) a head position tracker 3320 supported by the housing 3200; (c) a binaural audio system (not shown) supported by the housing 3200; (d) a first ultrasound speaker 3380 supported by the housing 3200; (e) a second ultrasound speaker 3390 supported by the housing 3200; (f) a speaker array 3600 supported by the housing 3200; (g) a subwoofer 3650 supported by the housing 3200; (h) an ultrasound speaker array 3710 supported by the hood 3700; (i) a third ultrasound speaker 3750 supported by the hood 3700; and (j) a processor (not shown) and a memory device (not shown) that co-act or work together with the above-mentioned components to provide binaurally encoded surround audio output (or transmitted) by ultrasound speakers and non-ultrasound speakers.

In this example embodiment, the first or intermediate display device 3300, the head position tracker 3320, the first ultrasound speaker 3380, the second ultrasound speaker 3390, the speaker array 3600, the subwoofer 3650, the processor, and the memory device are configured to produce and output sound beams by operating in real-time or substantially real-time to: (a) cause the first or intermediate display device 3300 to display a play of a game; (b) cause the first or intermediate display device 3300 to display a 3D image to a player, wherein the 3D image includes a virtual object associated with 3D coordinates; (c) operate with the head position tracker 3320 to capture player head position information; (d) cause the binaural audio system to generate a surround binaural audio stream including encoded binaural information based on the captured player head position information and the 3D coordinates associated with the virtual object; (e) cause the first ultrasound speaker 3380 to output a first sound beam based on the surround binaural audio stream; (f) cause the second ultrasound speaker 3390 to output a second sound beam based on the surround binaural audio stream; (g) cause the speaker array 3600 to output a third sound beam based on the surround binaural audio stream; (h) cause the subwoofer 3650 to output a fourth sound beam based on the surround binaural audio stream; (i) cause the ultrasound speaker array 3710 to output a fifth sound beam based on the surround binaural audio stream; and (j) cause the third ultrasound speaker 3750 to output a sixth sound beam based on the surround binaural audio stream.

It should be appreciated that the processor and the memory device may be configured to operate with one or more sound cards to cause the production and output sound beams by the first ultrasound speaker 3380, the second ultrasound speaker 3390, the speaker array 3600, the subwoofer 3650, the ultrasound speaker array 3710, and the third ultrasound speaker 3750. In some embodiments, the processor and/or the memory device is integrated with the one or more sound cards. In some embodiments, the one or more sound cards are integrated with the first ultrasound speaker 3380, the second ultrasound speaker 3390, the speaker array 3600, the subwoofer 3650, the ultrasound speaker array 3710, and the third ultrasound speaker 3750.

In this illustrated example embodiment, and similar to the EGM 1100 of FIG. 8, the plurality of output devices of the EGM 3100 includes: (a) the first or intermediate display device 3300; (b) a second or upper display device 3400 positioned above the first or intermediate display device 3300; and (c) a third or lower display device 3500 positioned below the first or intermediate display device 3300.

In this illustrated example embodiment, and similar to the EGM 1100 of FIG. 8, the plurality of player input devices enable the player to play one or more wager games provided by the EGM 3100.

In this illustrated example embodiment, the EGM 3100 is configured to operate similar to the EGM 1100 of FIG. 8 and, thus, is not described in more detail in this section.

In this illustrated example embodiment, the gaming chair 3800 includes a frame (not shown) and includes a seat portion and a back portion. The seat portion of the gaming chair 3800 includes a top surface 3810. The back portion of the gaming chair 3800 includes a front surface 3840 and an opposing rear surface 3850. The gaming chair 3800 also includes a chair hood 3870.

In this illustrated example embodiment, the EGM 3100 and the gaming chair 3800 are coupled to a surface 3990.

VI. Electronic Gaming System—EGM and Gaming Chair Including Speakers

Referring now to FIGS. 11 to 14, an example electronic gaming system of the present disclosure is generally illustrated and indicated by numeral 4000. This example electronic gaming system 4000 illustrated in FIGS. 11 to 14 generally includes an EGM 4100 having a housing 4200 and a hood 4700 extending from the top of the housing 4200. The electronic gaming system 4000 also includes a gaming chair 4800.

In this illustrated example embodiment, the EGM 4100 is configured to operate similar to the EGM 1100 of FIG. 8 and, thus, is not described in more detail in this section.

In this illustrated example embodiment, the gaming chair 4800 of FIGS. 11 to 14 generally includes a seat portion, a back portion 4850, and a chair hood 4870. In this illustrated example embodiment, the gaming chair 4800 includes: (a) a first seat portion ultrasound speaker 4815 supported by a first side of the seat portion of the gaming chair 4800; (b) a second seat portion ultrasound speaker (not shown) supported by an opposing second side of the seat portion of the gaming chair 4800; (c) a first chair ultrasound speaker 4845 supported by the back portion 4850; (d) a second chair ultrasound speaker 4847 supported by the back portion 4850; (e) a chair speaker 4855 supported by the back portion

4850; (f) a chair hood ultrasound speaker 4875 supported by the chair hood 4870; (g) a lower back portion speaker 4890 supported by the back portion 4850; and (h) a back portion ultrasound speaker 4895 supported by the back portion 4850.

In this illustrated example embodiment, the speakers and ultrasound speakers included in the gaming chair 4800 are configured to output sound beams based on audio signals included in the surround binaural audio stream generated by the binaural audio system of the EGM 4100. For example, the speakers and ultrasound speakers included in the gaming chair 4800 may simultaneously output sound beams based on the audio signals included in the surround binaural audio stream. In certain embodiments, the speakers and ultrasound speakers included in the gaming chair 4800 output sound beams simultaneously with the speakers and ultrasound speakers included in the EGM 4100.

In certain embodiments, the gaming chair 4800 includes a processor and/or a memory device to facilitate control of the speakers and ultrasound speakers included in the gaming chair 4800. In certain embodiments, the speakers and ultrasound speakers included in the gaming chair 4800 are controlled by a processor and/or a memory device external to the gaming chair 4800.

In certain embodiments, one or more of the speakers and/or ultrasound speakers included in the gaming chair 4800 may output sound beams in the direction of the player 1. For example, the sound beams output in the direction of the player 1 may be output to reward the player 1 for sitting at the electronic gaming system 4000, may be associated with the play of the game, etc.

In certain embodiments, one or more of the speakers and/or ultrasound speakers included in the gaming chair 4800 may output sound beams in a direction away from the player 1. For example, the sound beams output in a direction away from the player 1 may be to attract people to play at the electronic gaming system 4000. In certain embodiments, one or more of the sound beams output in a direction away from the player 1 may be directed to a particular person not seated at the electronic gaming system 4000.

In this illustrated example embodiment, the first seat portion ultrasound speaker 4815 and the second seat portion ultrasound speaker are positioned to output sound beams away from the player 1. For example, the first seat portion ultrasound speaker 4815 and the second seat portion ultrasound speaker may be configured to output sound beams based on audio signals of the surround binaural audio stream. In certain embodiments, the sound beams output by the first seat portion ultrasound speaker 4815 and the second seat portion ultrasound speaker are output to attract persons not seated at the electronic gaming system 4000.

In this illustrated example embodiment, the first chair ultrasound speaker 4845 and the second chair ultrasound speaker 4847 are respectively positioned in a stereo configuration with respect to a position at which the player 1 can be seated in the gaming chair 4800. In this illustrated example embodiment, the first chair ultrasound speaker 4845 and the second chair ultrasound speaker 4847 output sound beams based on audio signals included in the surround binaural audio stream. In this illustrated example embodiment, the first chair ultrasound speaker 4845 and the second chair ultrasound speaker 4847 output directional sound beams in the direction of the player 1 (e.g., at an ear of the player 1). In certain embodiments, the sound beams output by the first chair ultrasound speaker 4845 and the second chair ultrasound speaker 4847 may be associated with the play of the game.

In this illustrated example embodiment, the chair speaker 4855 outputs sound beams based on audio signals included in the surround binaural audio stream. In this illustrated example embodiment, the chair speaker 4855 outputs sound beams in the general direction of the player 1 (e.g., not directional sound beams). In certain embodiments, the sound beams output by the chair speaker 4855 may be associated with the play of the game.

In this illustrated example embodiment, the chair hood ultrasound speaker 4875 outputs sound beams based on audio signals included in the surround binaural audio stream. In this illustrated example embodiment, the chair hood ultrasound speaker 4875 outputs directional sound beams in the direction of the player 1. In certain embodiments, the sound beams output by the chair hood ultrasound speaker 4875 may be associated with the play of the game.

In this illustrated example embodiment, the lower back portion speaker 4890 outputs sound beams based on audio signals included in the surround binaural audio stream. In this illustrated example embodiment, the lower back portion speaker 4890 is positioned to output sound beams away from the player 1. For example, the lower back portion speaker 4890 may be configured to output sound beams based on audio signals of the surround binaural audio stream. In certain embodiments, the sound beams output by the lower back portion speaker 4890 are output to attract persons not seated at the electronic gaming system 4000.

In this illustrated example embodiment, the back portion ultrasound speaker 4895 outputs sound beams based on audio signals included in the surround binaural audio stream. In this illustrated example embodiment, the back portion ultrasound speaker 4895 is positioned to output sound beams away from the player 1. For example, the back portion ultrasound speaker 4895 may be configured to output sound beams based on audio signals of the surround binaural audio stream. In certain embodiments, the sound beams output by the back portion ultrasound speaker 4895 are output to attract persons not seated at the electronic gaming system 4000.

Referring now to FIGS. 15 to 21, various examples of how the electronic gaming system can function to provide directional and non-directional audio based on audio signals included in the surround binaural audio stream are provided. It should be appreciated that the present disclosure is not limited to these examples, and that the electronic gaming systems of the present disclosure can provide various types of audio.

FIGS. 15 to 18 illustrate different operations of an electronic gaming system 5000. The electronic gaming system 5000 includes an EGM 5100 and a gaming chair 5800. In this example embodiment, the electronic gaming system 5000 is configured to operate similar to the electronic gaming system 4000 of FIGS. 11 to 14 (and the EGM 1100 of FIG. 8) and, thus, is not described in more detail in this section. Certain parts of the electronic gaming system 4000 and/or the EGM 1100 that are not shown in the electronic gaming system 5000 are omitted for clarity.

FIG. 15 shows the player 1 seated in the gaming chair 5800. FIG. 15 also shows a first sound beam 5002 output by the EGM 5100. The first sound beam 5002 is a non-directional sound beam (sometimes referred to as a "conventional sound beam") that is output in the general direction of the player 1. The first sound beam 5002 may be output by a speaker array such as the example speaker array 1600 of the EGM 1100. The non-directional sound beam 5002 may be associated with, for example, background audio associated with a play of a game.

FIG. 16 shows the player 1 seated in the gaming chair 5800. FIG. 16 also shows a second sound beam 5004 output by the EGM 5100. The second sound beam 5004 is a directional sound beam that is output by the EGM 5100 based on player head position information. The second sound beam 5004 may be output by an ultrasound speaker, such as the first ultrasound speaker 1380 and/or the second ultrasound speaker 1390 of the EGM 1100. The directional sound beam 5004 may be associated with, for example, a virtual object and/or a virtual audio object displayed by the EGM 5100.

FIG. 17 shows the player 1 seated in the gaming chair 5800 and non-players 2 positioned near the electronic gaming system 5000. FIG. 17 also shows the second sound beam 5004 output by the EGM 5100 in the direction of the player 1 based on player head position information. FIG. 17 also shows a third sound beam 5006 output by the EGM 5100. The third sound beam 5006 is a non-directional sound beam that is generally output away from the player 1 and in the general direction of non-players 2. Although, it should be appreciated that non-directional sound beams may be still be heard by the player 1. The third sound beam may be output by a speaker array, such as the example speaker array 1600 of the EGM 1100. The third sound beam may additionally or alternatively be output by the ultrasound speaker array 1710 of the EGM 1100. The non-directional sound beam 5006 may be associated with, for example, background audio associated with a play of the game, may be associated with audio output in an attempt to attract a non-player to play the game, etc.

Figure 18:
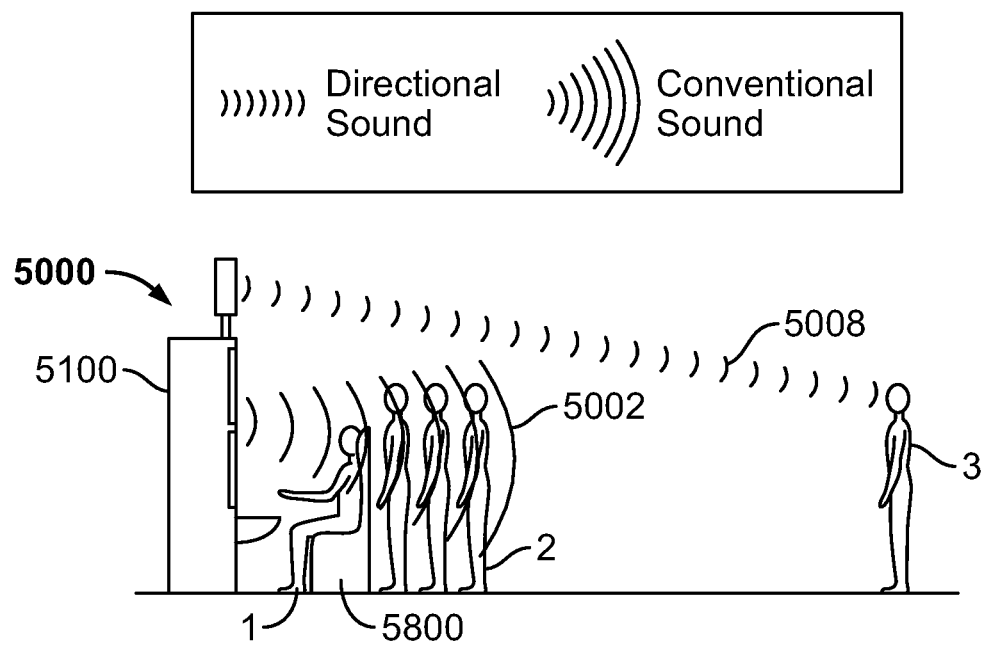
FIG. 18 is a side view of the EGM and the gaming chair of FIG. 10, and an area adjacent to the EGM and the gaming chair.

FIG. 18 shows the player 1 seated in the gaming chair 5800, non-players 2 positioned relatively near the electronic gaming system 5000, and a non-player 3 positioned relatively far from the electronic gaming system 5000. FIG. 18 also shows the non-directional sound beam 5002 output by the EGM 5100. FIG. 18 also shows a fourth sound beam 5008 output by the EGM 5100. The fourth sound beam 5008 is a directional sound beam that is output by the EGM 5100 based on player head position information. In this illustrated example embodiment, the player head position information is associated with the non-player 3. For example, a player head tracker included in the EGM 5100 and/or a nearby EGM in communication with the EGM 5100 may have tracked the non-player 3 and determined XYZ coordinates of the non-player 3 relative to the EGM 5100. The EGM 5100 may then output the directional sound beam 5008 in the direction of the non-player 3 (e.g., towards the head of the non-player 3). In certain embodiments, the EGM 5100 may output the directional sound beam 5008 when, for example, the non-player 3 is identified by the EGM 5100 (e.g., a previous player whose top score is being challenged by the player 1, etc.).

Figure 19:
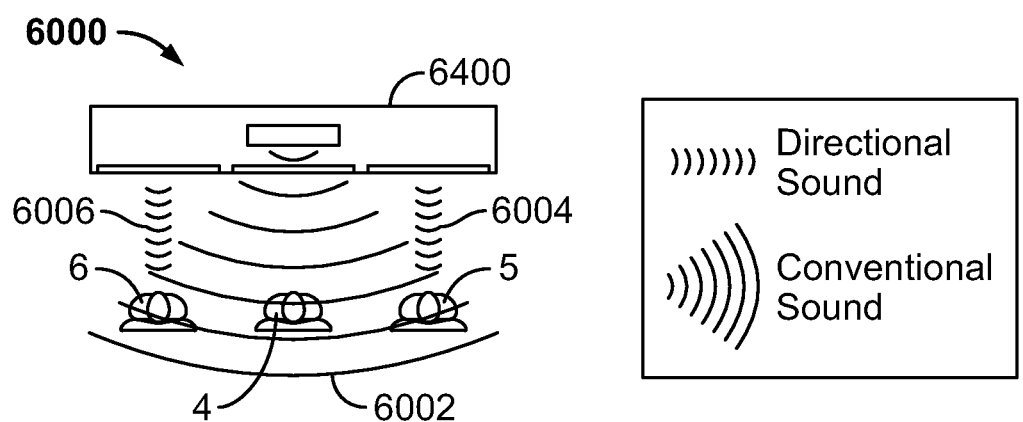
FIG. 19 is a side view of the EGM and the gaming chair of FIG. 10, and an area adjacent to the EGM and the gaming chair.

Referring now to FIG. 19, FIG. 19 illustrates a bank of EGMs 6100 including a first EGM 6100a, a second EGM 6100b, and a third EGM 6100c. FIG. 19 also illustrates a first player 4, a second player 5, and a third player 6, who are seated at the respective EGMs 6100a, 6100b, and 6100c. FIG. 19 shows a first sound beam 6002 output by the EGM 6100a. In the illustrated example embodiment, the first sound beam 6002 is a non-directional sound beam that is output in the general direction of the players 4, 5, and 6 seated at the bank of EGMs 6100. The first sound beam 6002 may be output by a speaker array such as the example speaker array 1600 of the EGM 1100. The non-directional sound beam 6002 may be associated with, for example, background audio associated with a play of a game.

FIG. 19 also shows a second sound beam 6004 output by the second EGM 6100b and a third sound beam 6006 output by the third EGM 6100c. The second and third sound beams 6004 and 6006 are directional sound beams based on player head position information. For example, the player head tracker of the second EGM 6100b captures player head position information associated with the player 5 and the second EGM 6100b generates audio signals to output in the direction of the player 5. Similarly, the player head tracker of the third EGM 6100c captures player head position information associated with the player 6 and the third EGM 6100c generates audio signals to output in the direction of the player 6. The second sound beam 6004 and the third sound beam 6006 may be output by an ultrasound speaker, such as the first ultrasound speaker 1380 and/or the second ultrasound speaker 1390 of the EGM 1100. The directional sound beams 6004 and 6006 may be associated with, for example, a virtual object and/or a virtual audio object displayed by the EGM 5100.

It should be appreciated that, in certain embodiments, the bank of EGMs 6100 may include shared resources. For example, the bank of EGMs 6100 may include a single player head tracker that is able to capture player head position from any players seated at the bank of EGMs 6100.

Figure 20:
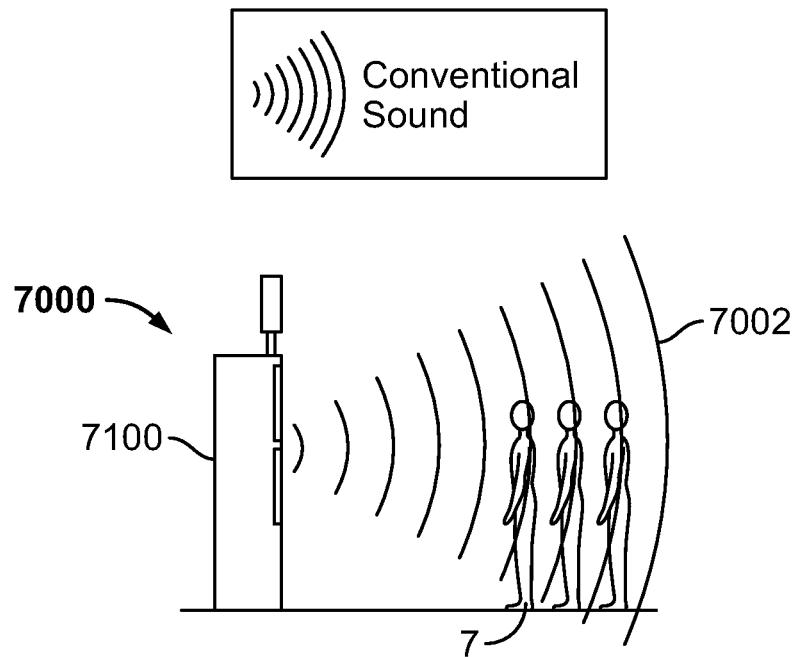
FIG. 20 is a side view of the EGM and the gaming chair of FIG. 10, and an area adjacent to the EGM and the gaming chair.
Figure 21:
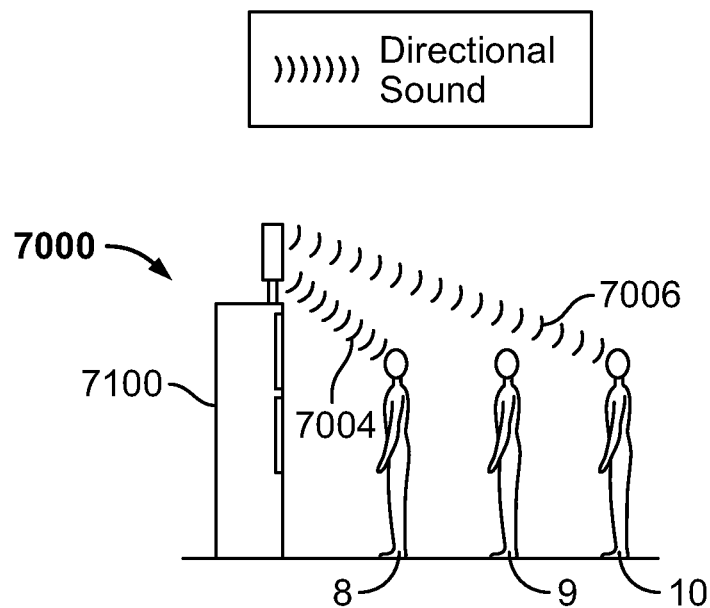
FIG. 21 is a side view of the EGM and the gaming chair of FIG. 10 and an area adjacent to the EGM and the gaming chair.

FIGS. 20 and 21 illustrate different operations of an electronic gaming system 7000 including an EGM 7100. FIG. 20 illustrates non-players 7 who are positioned away from the EGM 7100. In the illustrated example embodiment, the EGM 7100 outputs a first sound beam 7002 in the general direction of the non-players 7. In the illustrated example embodiment, the first sound beam 7002 is a non-directional sound beam that is output in the general direction of the non-players 7 positioned away from the EGM 7100. The first sound beam 7002 may be output by a speaker array such as the example speaker array 1600 of the EGM 1100. The non-directional sound beam 7002 may be associated with, for example, background audio output by the EGM 7100 in an attempt to attract non-players.

FIG. 20 illustrates a first non-player 8, a second non-player 9, and a third non-player 10. Each of the non-players 8, 9, and 10 are positioned away from the EGM 7100. In the illustrated example embodiment, the EGM 7100 outputs a second sound beam 7004 and a third sound beam 7006. The second sound beam 7004 and the third sound beam 7006 are directional sound beams output based on player head position information. For example, the player head tracker included in the EGM 7100 may have tracked the non-players 8, 9, and 10, and identified non-player 8 and non-player 10. Using XYZ coordinates of the head of the non-players 8 and 10, the EGM 7100 outputs the second sound beam 7004 in the direction of the non-player 8 based on player head position information associated with the non-player 8. The EGM 7100 also outputs the third sound beam 7006 in the direction of the non-player 10 based on player head position information associated with the non-player 10. In the illustrated example embodiment, the directional sound beams 7004 and 7006 may be output by the third ultrasound speaker 1750 and/or the ultrasound speaker array 1710.

VII. Electronic Gaming System—EGM Including Two Display Devices

Figure 22:
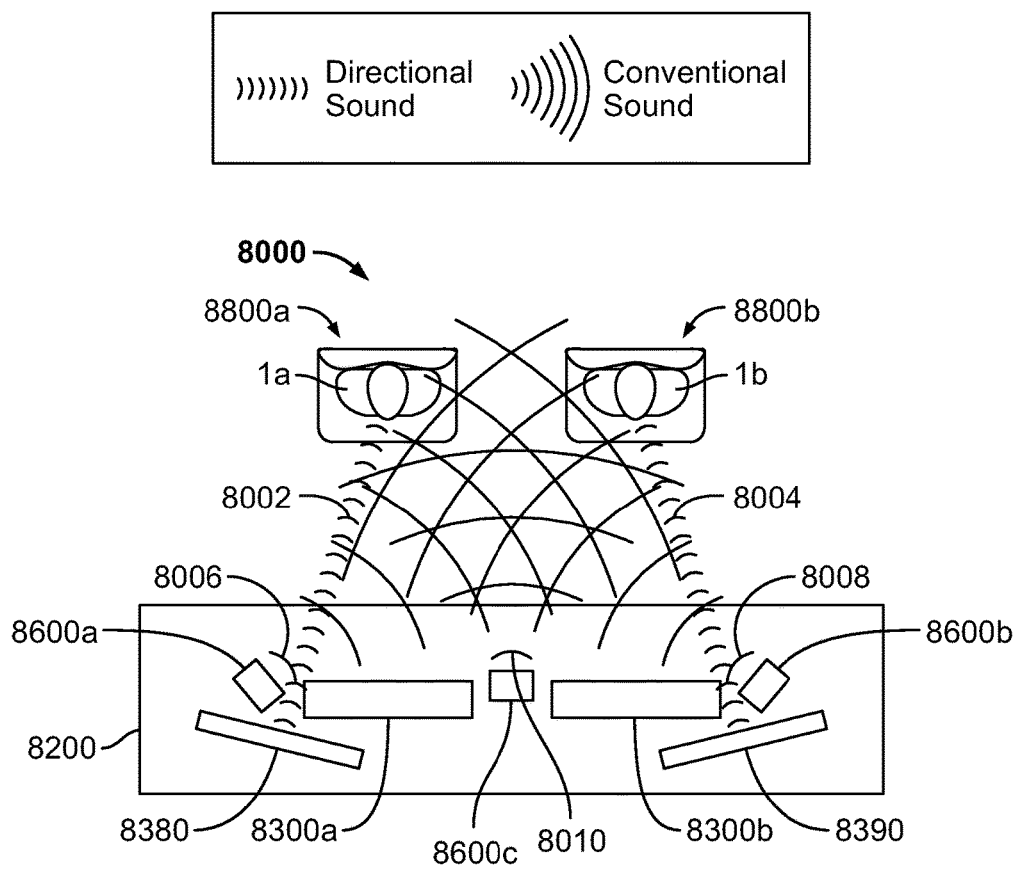
FIG. 22 is a top diagrammatical view of one example embodiment of another EGM of the present disclosure.

Referring now to FIG. 22, FIG. 22 illustrates another example electronic gaming system 8000 of the present disclosure. In this example embodiment, the electronic gaming system 8000 includes an EGM 8100 including a housing 8200, a first gaming chair 8800a, and a second gaming chair

8800*b*. The example EGM 8100 includes: (a) a first display device 8300*a* supported by the housing 8200; (b) a second display device 8300*b* supported by the housing 8200; (c) a head position tracker (not shown) supported by the housing 8200; (d) a binaural audio system (not shown) supported by the housing 8200; (e) a first ultrasound speaker 8380 supported by the housing 8200; (f) a second ultrasound speaker 8390 supported by the housing 8200, (g) a first non-directional speaker 8600*a* supported by the housing 8200; (h) a second non-directional speaker 8600*b* supported by the housing 8200; (i) a third non-directional speaker 8600*c* supported by the housing 8200; and (j) a processor (not shown) and a memory device (not shown) that co-act or work together with the above-mentioned components to provide binaurally encoded surround audio output (or transmitted) by ultrasound speakers and non-ultrasound speakers. In this example embodiment, the first ultrasound speaker 8380 and the second ultrasound speaker 8390 are respectively positioned in a stereo configuration with respect to a center position of the housing 8200. For example, the first ultrasound speaker 8380 and the second ultrasound speaker 8390 are in a stereo configuration with respect to a first position at which a first player 1*a* can be seated in front of the housing and with respect to a second position at which a second player 1*b* can be seated in front of the housing 8200. The ultrasound speakers 8380 and 8390 output directional sound beams based on player head position information.

In this example embodiment, the first non-directional speaker 8600*a* is positioned adjacent to the first ultrasound speaker 8380, the second non-directional speaker 8600*b* is positioned adjacent to the second ultrasound speaker 8390, and the third non-directional speaker is positioned between the first display device 8300*a* and the second display device 8300*b*.

In this example embodiment, the first display device 8300*a*, the second display device 8300*b*, the head position tracker, the binaural audio system, the first ultrasound speaker 8380, the second ultrasound speaker 8390, the processor, and the memory device are configured to produce and output sound beams by operating in real-time or substantially real-time to: (a) cause the first display device 8300*a* and the second display device 8300*b* to display a play of a game; (b) cause the first display device 8300*a* to display a first 3D image to the first player 1*a*, wherein the first 3D image includes a first virtual object associated with 3D coordinates relative to the first display device 8300*a*; (c) cause the second display device 8300*b* to display a second 3D image to the second player 1*b*, wherein the second 3D image includes a second virtual object associated with 3D coordinates relative to the second display device 8300*b*; (d) operate with the head position tracker to capture first player head position information associated with the first player 1*a*; (e) operate with the head position tracker to capture second player head position information associated with the second player 1*b*; (f) cause the binaural audio system to generate a stereo binaural audio stream including encoded binaural information based on the first player head position information, the second player head position information, the 3D coordinates associated with the first virtual object, and the 3D coordinates associated with the second virtual object; (g) cause the first ultrasound speaker 8380 to output a first sound beam based on the stereo binaural audio stream in a direction of the first player 1*a*; and (h) cause the second ultrasonic speaker 8390 to output a second sound beam based on the stereo binaural audio stream in a direction of the second player 1*b*.

It should be appreciated that the processor and the memory device may be configured to operate with one or more sound cards to cause the production and output of sound beams by the first ultrasound speaker 8380, the second ultrasound speaker 8390, the first non-directional speaker 8600*a*, the second non-directional speaker 8600*b*, and the third non-directional speaker 8600*c*. In some embodiments, the processor and/or the memory device is integrated with the one or more sound cards. In some embodiments, the one or more sound cards are integrated with the first ultrasound speaker 8380, the second ultrasound speaker 8390, the first non-directional speaker 8600*a*, the second non-directional speaker 8600*b*, and/or the third non-directional speaker 8600*c*.

In this illustrated example embodiment, the first display device 8300*a* and the second display device 8300*b* of the EGM 8100 are configured to display one or more 3D images to the players without requiring the players to wear 3D glasses. The first and second display devices 8300*a* and 8300*b* of the EGM 8100 operates similar to the first display device 300 of the EGM 100 and, thus, are not described in more detail in this section.

In this illustrated example embodiment, the head position tracker of the EGM 8100 is configured to track the movement of the eyes and/or the head of the respective players 1*a* and 1*b*. The head position tracker of the EGM 8100 operates similar to the head position tracker 320 of the EGM 100 and, thus, is not described in more detail in this section. It should be appreciated that in certain embodiments, the EGM 8100 may include separate head position trackers for each of the players.

In the illustrated example embodiment, the binaural audio system of the EGM 8100 is configured to produce and generate a surround binaural audio stream encoded with binaural information that is output by the ultrasound speakers 8380 and 8390, the first non-directional speaker 8600*a*, the second non-directional speaker 8600*b*, and the third non-directional speaker 8600*c*. The binaural audio system of the EGM 8100 operates similar to the binaural audio system of the EGM 1100 of FIG. 8 and, thus, is not described in more detail in this section.

In the illustrated example embodiment, the surround binaural audio stream includes a first directional audio signal based on the first player head position information associated with the first player 1*a*, a second directional audio signal based on the second player head position information associated with the second player 1*b*, a first non-directional audio signal, a second non-directional audio signal, and a third non-directional audio signal.

In the illustrated example embodiment, the EGM 8100 causes the first ultrasound speaker 8380 to output a first sound beam 8002 based on the first directional audio signal of the surround binaural audio stream. In the illustrated example embodiment, the first sound beam 8002 is output towards the first player 1*a* based on the first player head position information. In the illustrated example embodiment, the first sound beam 8002 is output towards the outside ear of the first player 1*a*.

In the illustrated example embodiment, the EGM 8100 causes the second ultrasound speaker 8390 to output a second sound beam 8004 based on the second directional audio signal of the surround binaural audio stream. In the illustrated example embodiment, the second sound beam 8004 is output towards the second player 1*b* based on the second player head position information. In the illustrated example embodiment, the second sound beam 8004 is output towards the outside ear of the second player 1*b*.

In the illustrated example embodiment, the EGM 8100 causes the first non-directional speaker 8600*a* to output a third sound beam 8006 based on the first non-directional audio signal of the surround binaural audio stream. In the illustrated example embodiment, the third sound beam 8006 is a non-directional sound beam that is output in the general direction of the second player 1*b*.

In the illustrated example embodiment, the EGM 8100 causes the second non-directional speaker 8600*b* to output a fourth sound beam 8008 based on the second non-directional audio signal of the surround binaural audio stream. In the illustrated example embodiment, the fourth sound beam 8008 is a non-directional sound beam that is output in the general direction of the first player 1*a*.

In the illustrated example embodiment, the EGM 8100 causes the third non-directional speaker 8600*c* to output a fifth sound beam 8010 based on the third non-directional audio signal of the surround binaural audio stream. In the illustrated example embodiment, the fifth sound beam 8010 is a non-directional sound beam that is output in the general direction of the first player 1*a* and the second player 1*b*.

In the illustrated example embodiment, the EGM 8100 causes the speakers 8380, 8390, 8600*a*, 8600*b*, and 8600*c* to simultaneously output their respective sound beams.

VIII. EGM—General Components and Operation

The EGM of the present disclosure can be controlled locally by one or more processors, and/or remotely or partially remotely by one or more remote processors, central servers, central controllers, or remote host. In various embodiments, the EGM of the present disclosure can be part of a gaming system (which is also part of the present disclosure) that includes one or more EGMs in combination with one or more remote processors, central servers, central controllers, or remote hosts. In such embodiments, the EGM is configured to communicate with the remote processors, central servers, central controllers, or remote hosts through a data network or remote communication link. In certain such embodiments, the EGM is configured to communicate with one or more other EGMs through the same data network or remote communication link or through a different data network or remote communication link.

In certain embodiments in which the gaming system includes an EGM in combination with a remote processor, central server, central controller, or remote host, the remote processor, central server, central controller, or remote host is any suitable computing device that includes at least one processor and at least one memory device or data storage device. As further described herein, the EGM includes at least one EGM processor configured to transmit and receive data or signals representing events, messages, commands, or any other suitable information between the EGM and the remote processor, central server, central controller, or remote host. The at least one processor of that EGM is configured to execute the events, messages, or commands represented by such data or signals in conjunction with the operation of the EGM. Moreover, the at least one processor of the remote processor, central server, central controller, or remote host is configured to transmit and receive data or signals representing events, messages, commands, or any other suitable information between the remote processor, central server, central controller, or remote host and the EGM. One, more than one, or each of the functions of the at least one processor of the EGM may be performed by the remote processor, the central server, the central controller, or the remote host.

In certain such embodiments, computerized instructions for controlling any games (such as any primary or base games and/or any secondary or bonus games) displayed by the EGM are executed by the remote processor, central server, central controller, or remote host. In such "thin client" embodiments, the remote processor, central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the remote processor, central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a remote processor, central server, central controller, or remote host, computerized instructions for controlling any primary or base games displayed by the EGM are communicated from the remote processor, central server, central controller, or remote host to the EGM in a thick client configuration, and computerized instructions for controlling any secondary or bonus games or other functions displayed by the EGM are executed by the remote processor, central server, central controller, or remote host in a thin client configuration.

In certain embodiments in which the gaming system includes: (a) an EGM configured to communicate with a remote processor, central server, central controller, or remote host through a data network; and/or (b) a plurality of EGMs configured to communicate with one another through a data network, the data network is a local area network (LAN) in which the EGMs are located substantially proximate to one another and/or the remote processor, central server, central controller, or remote host. In one example, the EGMs and the remote processor, central server, central controller, or remote host are located in a gaming establishment or a portion of a gaming establishment.

In other embodiments in which the gaming system includes: (a) an EGM configured to communicate with a remote processor, central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the remote processor, central server, central controller, or remote host. For example, one or more of the EGMs are located: (a) in an area of a gaming establishment different from an area of the gaming establishment in which the remote processor, central server, central controller, or remote host is located; or (b) in a gaming establishment different from the gaming establishment in which the remote processor, central server, central controller, or remote host is located. In another example, the remote processor, central server, central controller, or remote host is not located within a gaming establishment in which the EGMs are located. In certain embodiments in which the data network is a WAN, the gaming system includes a remote processor, central server, central controller, or remote host and an EGM each located in a different gaming establishment in a same geographic area, such as a same city or a same state. Gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a remote processor, central server, central controller, or remote host through a data network; and/or (b) a plurality of EGMs configured to communicate with one another through a data network, the data network is an internet (such as the Internet) or an intranet. In certain such embodiments, an Internet browser of the EGM is usable to access an Internet game page from any location where an Internet connection is available. In one such embodiment, after the EGM accesses the Internet game page, the remote processor, central server, central controller, or remote host identifies a player prior to enabling that player to place any wagers on any plays of any wagering games. In one example, the remote processor, central server, central controller, or remote host identifies the player by requiring a player account of the player to be logged into via an input of a unique username and password combination assigned to the player. The remote processor, central server, central controller, or remote host may, however, identify the player in any other suitable manner, such as: by validating a player tracking identification number associated with the player; by reading a player tracking card or other smart card inserted into a card reader (as described below); by validating a unique player identification number associated with the player by the remote processor, central server, central controller, or remote host; or by identifying the EGM, such as by identifying the MAC address or the IP address of the Internet facilitator. In various embodiments, once the remote processor, central server, central controller, or remote host identifies the player, the remote processor, central server, central controller, or remote host enables placement of one or more wagers on one or more plays of one or more primary or base games and/or one or more secondary or bonus games, and displays those plays via the Internet browser of the EGM. Examples of implementations of Internet-based gaming are further described in U.S. Pat. No. 8,764,566, entitled "Internet Remote Game Server," and U.S. Pat. No. 8,147,334, entitled "Universal Game Server."

The remote processor, central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Figure 23:
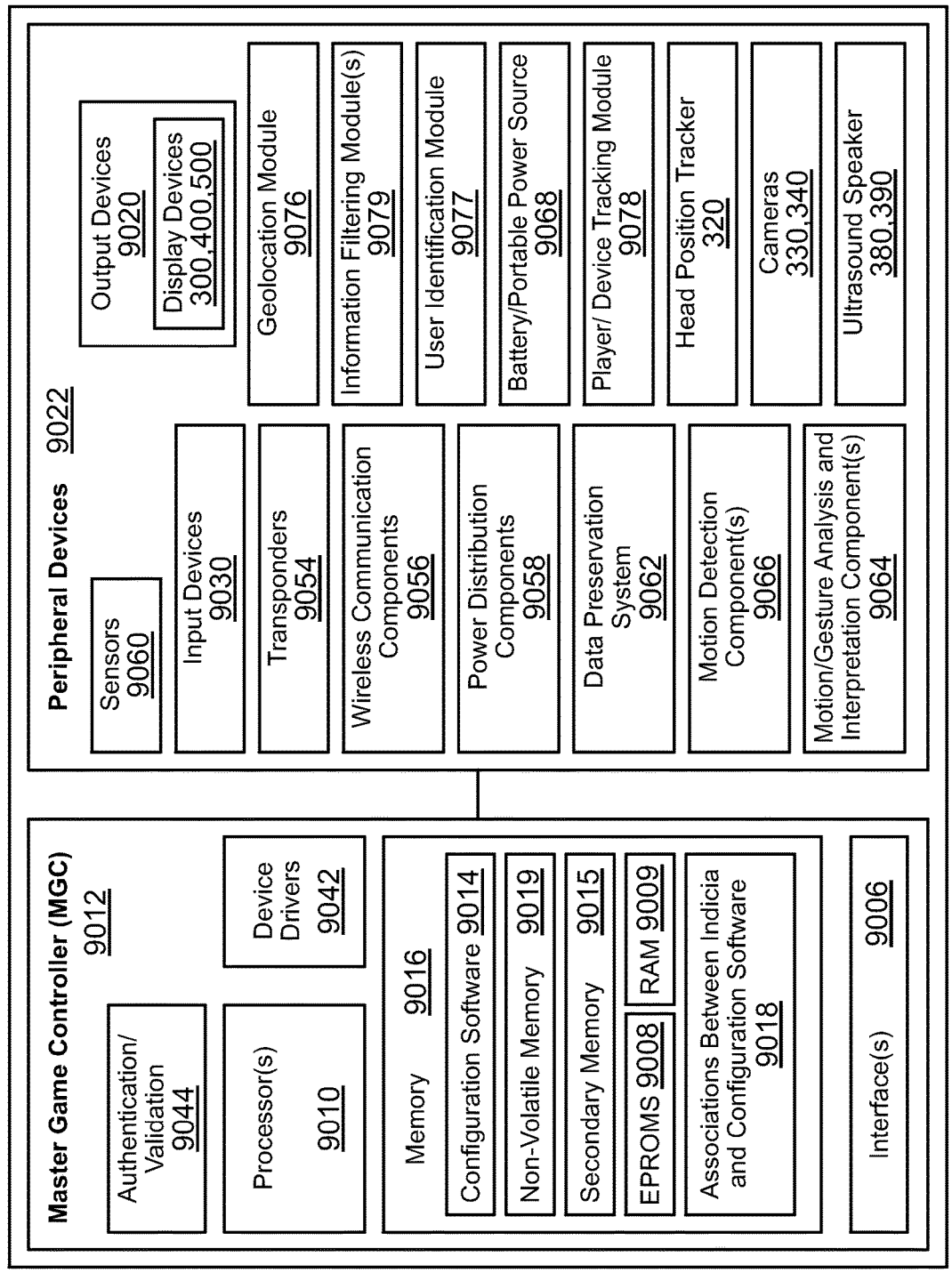
FIG. 23 is a schematic block diagram of one example embodiment of the electronic configuration of an example EGM of the present disclosure.

Referring now to FIG. 23, in various embodiments, the EGM 9000 includes a master gaming controller 9012 configured to communicate with and to operate with a plurality of peripheral devices 9022 (in addition to and including the above described devices 320, 330, 340, 380, 390)). While the EGM 9000 includes components of the EGM 100 of FIGS. 1 to 5, it should be appreciated that the EGM 9000 may correspond any of the other EGMs disclosed herein.

The master gaming controller 9012 includes at least one processor 9010. The at least one processor 9010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 9006 of the master gaming controller 9012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 9022 (such as input/output devices); and/or (5) controlling the peripheral devices 9022. In certain embodiments, one or more components of the master gaming controller 9012 (such as the at least one processor 9010) reside within a housing of the EGM (described below), while in other embodiments at least one component of the master gaming controller 9012 resides outside of the housing of the EGM.

The master gaming controller 9012 also includes at least one memory device 9016, which includes: (1) volatile memory (e.g., RAM 9009, which can include non-volatile RAM, magnetic RAM, ferroelectric RAM, and any other suitable forms); (2) non-volatile memory 9019 (e.g., disk memory, FLASH memory, EPROMs, EEPROMs, memristor-based non-volatile solid-state memory, etc.); (3) unalterable memory (e.g., EPROMs 9008); (4) read-only memory; and/or (5) a secondary memory storage device 9015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 9016 resides within the housing of the EGM (described below), while in other embodiments at least one component of the at least one memory device 9016 resides outside of the housing of the EGM.

The at least one memory device 9016 is configured to store, for example: (1) configuration software 9014, such as all the parameters and settings for a game playable on the EGM; (2) associations 9018 between configuration indicia read from an EGM with one or more parameters and settings; (3) communication protocols configured to enable the at least one processor 9010 to communicate with the peripheral devices 90229022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 9012 communicates with other devices using a serial communication protocol. A few non-limiting examples of serial communication protocols that other devices, such as peripherals (e.g., a bill validator or a ticket printer), may use to communicate with the master game controller 9012 include USB, RS-232, and Netplex (a proprietary protocol developed by IGT).

In certain embodiments, the at least one memory device 9016 is configured to store program code and instructions executable by the at least one processor of the EGM to control the EGM. The at least one memory device 9016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 9016 also stores a plurality of device drivers 9042. Examples of different types of device drivers include device drivers for EGM components and device drivers for the peripheral components 9022. Typically, the device drivers 9042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™ near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 9016 can be upgraded as needed. For instance, when the at least one memory device 9016 is a hard drive, new games, new game options, new parameters, new settings for existing parameters, new settings for new parameters, new device drivers, and new communication protocols can be uploaded to the at least one memory device 9016 from the master game controller 9012 or from some other external device. As another example, when the at least one memory device 9016 includes a CD/DVD drive including a CD/DVD configured to store game options, parameters, and settings, the software stored in the at least one memory device 9016 can be upgraded by replacing a first CD/DVD with a second CD/DVD. In yet another example, when the at least one memory device 9016 uses flash memory 9019 or EPROM 9008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In certain embodiments, the at least one memory device 9016 also stores authentication and/or validation components 9044 configured to authenticate/validate specified EGM components and/or information, such as hardware components, software components, firmware components, peripheral device components, user input device components, information received from one or more user input devices, information stored in the at least one memory device 9016, etc. Examples of various authentication and/or validation components are described in U.S. Pat. No. 6,620,047, entitled "Electronic Gaming Apparatus Having Authentication Data Sets."

In certain embodiments, in addition to the input, output and other components described in the first section above, the peripheral devices 9022 include several device interfaces, such as: (1) at least one output device 9020 including at least one display device; (2) at least one input device 9030 (which may include contact and/or non-contact interfaces); (3) at least one transponder 9054; (4) at least one wireless communication component 9056; (5) at least one wired/wireless power distribution component 9058; (6) at least one sensor 9060; (7) at least one data preservation component 9062; (8) at least one motion/gesture analysis and interpretation component 9064; (9) at least one motion detection component 9066; (10) at least one portable power source 9068; (11) at least one geolocation module 9076; (12) at least one user identification module 9077; (13) at least one player/device tracking module 9078; and (14) at least one information filtering module 9079.

The at least one output device 9020 includes at least one display device configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 100 illustrated in FIG. 1 includes a first display device 300, a player tracking display, a credit display, and a bet display.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 9020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGM 100 and illustrated in FIG. 1 may include a ticket printer and dispenser. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; and U.S. Pat. No. 6,048,269, entitled "Coinless Slot Machine System and Method."

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine."

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 9020 includes one or more sound generating devices controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGM 100 illustrated in FIG. 1 includes a plurality of speakers. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 9030 may include any suitable device that enables an input signal to be produced and received by the at least one processor 9010 of the EGM.

In one embodiment, the at least one input device 9030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGM 100 illustrated in FIG. 1 may include a combined bill and ticket acceptor and a coin slot.

In one embodiment, the at least one input device 9030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine." When the EGM is funded, the at least one processor determines the amount of funds entered and displays the corresponding amount on a credit display or any other suitable display as described below.

In certain embodiments, the at least one input device 9030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 9030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGM 100 illustrated in FIG. 1 may include a game play activation device in the form of a game play initiation button. In other embodiments, the EGM begins game play automatically upon appropriate funding rather than upon utilization of the game play activation device.

In other embodiments, the at least one input device 9030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGM 100 illustrated in FIG. 1 may include a cashout device in the form of a cashout button.

In various embodiments, the at least one input device includes a plurality of buttons that are programmable by the EGM operator to, when actuated, cause the EGM to perform particular functions. For instance, such buttons may be hard keys, programmable soft keys, or icons displayed on a display device of the EGM (described below) that are actuatable via a touch screen of the EGM (described below) or via use of a suitable input device of the EGM (such as a mouse or a joystick). The example EGM 100 illustrated in FIG. 1 may include a plurality of such buttons.

In certain embodiments, the at least one input device 9030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 9030 includes a card reader in communication with the at least one processor of the EGM. The example EGM 100 illustrated in FIG. 1 may include a card reader. The card reader is configured to read a player identification card inserted into the card reader.

The at least one wireless communication component 9056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 9056 transmits electrical, electromagnetic, or optical signals that carry digital data streams or analog signals representing various types of information.

The at least one wired/wireless power distribution component 9058 includes components or devices that are configured to provide power to other devices. For example, in one embodiment, the at least one power distribution component 9058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 9058 is configured to distribute power to one or more internal components of the EGM, such as one or more rechargeable power sources (e.g., rechargeable batteries) located at the EGM.

In certain embodiments, in addition to the components described in the first section above, the at least one sensor 9060 includes at least one of: optical sensors, pressure sensors, RF sensors, infrared sensors, image sensors, thermal sensors, and biometric sensors. The at least one sensor 9060 may be used for a variety of functions, such as: detecting movements and/or gestures of various objects within a predetermined proximity to the EGM (in addition to the detections described above); detecting the presence and/or identity of various persons (e.g., players, casino employees, etc.), devices (e.g., user input devices), and/or systems within a predetermined proximity to the EGM.

The at least one data preservation component 9062 is configured to detect or sense one or more events and/or conditions that, for example, may result in damage to the EGM and/or that may result in loss of information associated with the EGM. Additionally, the data preservation system 9062 may be operable to initiate one or more appropriate action(s) in response to the detection of such events/conditions.

In addition to the player tracker described above, the EGM of the present disclosure can also include at least one motion/gesture analysis and interpretation component 9064 configured to analyze and/or interpret information relating to detected player movements and/or gestures to determine appropriate player input information relating to the detected player movements and/or gestures. For example, in one embodiment, the at least one motion/gesture analysis and interpretation component 9064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 9068 enables the EGM 9000 to operate in a mobile environment. For example, in one embodiment, the EGM 100 includes one or more rechargeable batteries.

The at least one geolocation module 9076 is configured to acquire geolocation information from one or more remote sources and use the acquired geolocation information to determine information relating to a relative and/or absolute position of the EGM. For example, in one implementation, the at least one geolocation module 9076 is configured to receive GPS signal information for use in determining the position or location of the EGM. In another implementation, the at least one geolocation module 9076 is configured to receive multiple wireless signals from multiple remote devices (e.g., EGMs, servers, wireless access points, etc.) and use the signal information to compute position/location information relating to the position or location of the EGM.

The at least one user identification module 9077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 9079 is configured to perform filtering (e.g., based on specified criteria) of selected information to be displayed at one or more displays of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

In certain embodiments, the EGM is a device that has obtained approval from a regulatory gaming commission, and in other embodiments, the EGM is a device that has not obtained approval from a regulatory gaming commission.

The EGMs described above are merely examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

In various embodiments, an EGM may be implemented in one of a variety of different configurations. In various embodiments, the EGM may be implemented as one of: (a) a dedicated EGM in which computerized game programs executable by the EGM for controlling any primary or base games (sometimes referred to herein as "primary games") and/or any secondary or bonus games or other functions (sometimes referred to herein as "secondary games") displayed by the EGM are provided with the EGM prior to delivery to a gaming establishment or prior to being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a remote processor, central server, central controller, or remote host and a changeable EGM, the at least one memory device of the remote processor, central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the remote processor, central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the EGM randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the EGM generates the game outcome(s) and/or the award(s) to be provided based on the associated probabilities. In these embodiments, since the EGM generates game outcomes and/or awards randomly or based on one or more probability calculations, there is no certainty that the EGM will ever provide any specific game outcome and/or award.

In certain embodiments, the EGM maintains one or more predetermined pools or sets of predetermined game outcomes and/or awards. In certain such embodiments, upon generation or receipt of a game outcome and/or award request, the EGM independently selects one of the predetermined game outcomes and/or awards from the one or more pools or sets. The EGM flags or marks the selected game outcome and/or award as used. Once a game outcome or an award is flagged as used, it is prevented from further selection from its respective pool or set; that is, the EGM does not select that game outcome or award upon another game outcome and/or award request. The EGM provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game."

In certain embodiments, the EGM determines a predetermined game outcome and/or award based on the results of a bingo, keno, or lottery game. In certain such embodiments, the EGM utilizes one or more bingo, keno, or lottery games to determine the predetermined game outcome and/or award provided for a primary game and/or a secondary game. The EGM is provided or associated with a bingo card. Each bingo card consists of a matrix or array of elements, wherein each element is designated with separate indicia. After a bingo card is provided, the EGM randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern."

In certain embodiments in which the EGM is configured to communicate with the remote processor, central server, central controller, or remote host for monitoring purposes only. In such embodiments, the EGM determines the game outcome(s) and/or award(s) to be provided in any of the manners described above, and the remote processor, central server, central controller, or remote host monitors the activities and events occurring on the EGM. In one such embodiment, the EGM includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services."

As noted above, in various embodiments, the EGM includes one or more executable game programs executable by at least one processor of the EGM to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the EGM includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the EGM. In certain such embodiments, the EGM includes one or more paylines associated with the reels. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The EGM enables a wager to be placed on one or more of such paylines to activate such paylines. In other embodiments in which one or more paylines are formed between at least two adjacent symbol display areas, the EGM enables a wager to be placed on a plurality of symbol display areas, which activates those symbol display areas.

In various embodiments, the EGM provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the EGM employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations."

In various embodiments, the EGM includes a progressive award. Typically, a progressive award includes an initial amount and an additional amount funded through a portion of each wager placed to initiate a play of a primary game. When one or more triggering events occurs, the EGM provides at least a portion of the progressive award. After the EGM provides the progressive award, an amount of the progressive award is reset to the initial amount and a portion of each subsequent wager is allocated to the next progressive award. Examples of progressive gaming systems or EGMs are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards."

As generally noted above, in addition to providing winning credits or other awards for one or more plays of the primary game(s), in various embodiments the EGM provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the EGM automatically provides or initiates the secondary game upon the occurrence of a triggering event or the satisfaction of a qualifying condition. In other embodiments, the EGM initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the EGM randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the EGM determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win."

In various embodiments, the gaming system or EGM includes one or more player tracking systems. Such player tracking systems enable operators of the gaming system or EGM (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the EGM to begin a gaming session, the card reader reads the player identification number off the player tracking card to identify the player. The EGM timely tracks any suitable information or data relating to the identified player's gaming session. The EGM also timely tracks when the player tracking card is removed to conclude play for that gaming session. In another embodiment, rather than requiring insertion of a player tracking card into the card reader, the EGM utilizes one or more portable devices, such as a mobile phone, a radio frequency identification tag, or any other suitable wireless device, to track when a gaming session begins and ends. In another embodiment, the EGM utilizes any suitable biometric technology or ticket technology to track when a gaming session begins and ends.

In such embodiments, during one or more gaming sessions, the EGM tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the first display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services."

Certain of the gaming systems described herein, including EGMs located in a casino or another gaming establishment, include certain components and/or are configured to operate in certain manners that differentiate these EGMs and systems from general purpose computing devices (i.e., certain personal gaming devices such as desktop computers and laptop computers).

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are typically not state-based machines, and a majority of data can be lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes."

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just prior to the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just prior to when the malfunction occurred. The restored state may include metering information and graphical information that was displayed on the EGM in the state prior to the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just prior to the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM prior to, during, and/or after the disputed game to demonstrate whether the player was correct or not in her assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play."

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification."

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment."

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System."

It should further be appreciated that the EGM of the present disclosure may have varying or alternative housing configurations.

It should further be appreciated that the EGM of the present disclosure may have varying or alternative display device configurations.

In various embodiments, the EGM of the present disclosure is configured to be positioned on a base or stand.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An electronic gaming machine comprising:
   a housing;
   a display device supported by the housing;
   a head position tracker supported by the housing;
   a binaural audio system supported by the housing;
   an ultrasound speaker array supported by the housing, wherein the ultrasound speaker array includes a plurality of transducers;
   a processor; and
   a memory device that stores a plurality of instructions that, when executed, cause the processor to:
   cause the display device to display a play of a game;
   cause the display device to display a 3D image to a player, wherein the 3D image includes a virtual object associated with 3D coordinates;
   operate with the head position tracker to capture player head position information;
   cause the binaural audio system to generate in real-time a stereo binaural audio stream including encoded binaural information based on the captured player head position information and the 3D coordinates associated with the virtual object;
   cause a first subset of transducers of the ultrasound speaker array to output a first sound beam generated in real-time based on the stereo binaural audio stream; and
   cause a second subset of transducers of the ultrasound speaker array to output a second sound beam generated in real-time based on the stereo binaural audio stream, wherein the first sound beam and the second sound beam are in a stereo configuration with respect to a position at which a player can be seated in front of the housing.

2. The electronic gaming machine of claim 1, wherein the plurality of instructions, when executed, cause the processor to:
   include an audio object in a 3D audio space that corresponds to the virtual object in the 3D image, wherein the audio object is associated with a corresponding position in the 3D audio space; and
   re-position the audio object in the 3D audio space.

3. The electronic gaming machine of claim 2, wherein the plurality of instructions, when executed, cause the processor to:
   cause the binaural audio system to produce a dynamic surround audio file of the audio object included in the 3D audio space based on the re-positioned audio object in the 3D audio space;
   cause the binaural audio system to generate an updated stereo binaural audio stream including the dynamic surround audio file;
   cause the display device to display an updated 3D image, wherein the updated 3D image includes a re-positioned virtual object; and
   simultaneously output the updated stereo binaural audio stream by causing the first subset of transducers of the ultrasound speaker array to output a first sound beam based on the updated stereo binaural audio stream and causing the second subset of transducers of the ultrasound speaker array to output a second sound beam based on the updated stereo binaural audio stream.

4. The electronic gaming machine of claim 1, wherein the binaural audio system comprises an audio processing engine configured to produce a dynamic surround audio file based on an updated position of an audio object in a 3D audio space that corresponds to the 3D image.

5. The electronic gaming machine of claim 4, wherein the audio processing engine is configured to:
generate a binaural audio stream based on the dynamic surround audio file; and
transmit the generated binaural audio stream to the electronic gaming machine via a communications protocol, wherein the electronic gaming machine is configured to output, via the plurality of transducers of the ultrasound speaker array, the binaural audio stream.

6. The electronic gaming machine of claim 1, wherein the first subset of transducers of the ultrasound speaker array direct the first sound beam in a first direction relative to the display device based on first player head position information and the second subset of transducers of the ultrasound speaker array direct the second sound beam in a second direction relative to the display device based on the first player head position information,
wherein a third subset of transducers of the ultrasound speaker array direct the first sound beam in a third direction relative to the display device based on second player head position information and a fourth subset of transducers of the ultrasound speaker array direct the second sound beam in a fourth direction relative to the display device based on the second player head position information, and
wherein the first direction is different than the third direction and the second direction is different than the fourth direction.

7. The electronic gaming machine of claim 1, further comprising a plurality of speakers supported by the housing and configured to output audio in a frequency range different than the plurality of transducers of the ultrasound speaker array.

8. The electronic gaming machine of claim 1, further comprising:
a first ultrasound speaker supported by the housing; and
a second ultrasound speaker supported by the housing, wherein the first ultrasound speaker and the second ultrasound speaker are in a stereo configuration with respect to a position at which the player can be seated in front of the housing.

9. The electronic gaming machine of claim 1, wherein the ultrasound speaker array comprises:
a first ultrasound speaker supported by the housing; and
a second ultrasound speaker supported by the housing, wherein the first ultrasound speaker and the second ultrasound speaker are in a stereo configuration with respect to a position at which the player can be seated in front of the housing.

10. The electronic gaming machine of claim 1, wherein the plurality of instructions that, when executed, cause the processor to cause the first subset of transducers of the ultrasound speaker array to output a first sound component of the stereo binaural audio stream, the second subset of transducers of the ultrasound speaker array to output a second sound component of the stereo binaural audio stream, and a plurality of speakers supported by the housing to output a third sound component of the stereo binaural audio stream, wherein the first sound component, the second sound component, and the third sound component are different sound components.

11. The electronic gaming machine of claim 1, wherein the plurality of instructions, when executed, cause the processor to:

cause the first subset of transducers of the ultrasound speaker array to output the first sound beam in the direction of a first ear of the player; and
cause the second subset of transducers of the ultrasound speaker array to output the second sound beam in the direction a second ear of the player.

12. The electronic gaming machine of claim 1, wherein the plurality of instructions, when executed, cause the processor to:
determine a distance based on the player head position information;
cause the first subset of transducers of the ultrasound speaker array to output the first sound beam at a first volume level based on the determined distance; and
cause the second subset of transducers of the ultrasound speaker array to output the second sound beam a second volume level based on the determined distance.

13. The electronic gaming system of claim 1, wherein the head position tracker is configured to track movement of a player's eyes and head as the player moves relative to the display device.

14. An electronic gaming machine comprising:
a housing;
a first display device supported by the housing;
a second display device supported by the housing and positioned adjacent to the first display device;
a head position tracker supported by the housing;
a binaural audio system supported by the housing;
a first ultrasound speaker supported by the housing;
a second ultrasound speaker supported by the housing, wherein the first ultrasound speaker and the second ultrasound speaker are in a stereo configuration with respect to a first position at which a first player can be seated in front of the housing and with respect to a second position at which a second player can be seated in front of the housing;
a processor; and
a memory device that stores a plurality of instructions that, when executed, cause the processor to:
cause the first display device and the second display device to display a play of a game;
cause the first display device to display a first 3D image to the first player, wherein the first 3D image includes a first virtual object associated with 3D coordinates relative to the first display device;
cause the second display device to display a second 3D image to the second player, wherein the second 3D image includes a second virtual object associated with 3D coordinates relative to the second display device;
operate with the head position tracker to capture first player head position information associated with the first player;
operate with the head position tracker to capture second player head position information associated with the second player;
cause the binaural audio system to generate a stereo binaural audio stream including encoded binaural information based on the first player head position information, the second player head position information, the 3D coordinates associated with the first virtual object, and the 3D coordinates associated with the second virtual object;
cause the first ultrasound speaker to output a first sound beam based on the stereo binaural audio stream in a direction of the first player; and cause the second ultrasonic speaker to output a second sound beam based on the stereo binaural audio stream in a direction of the second player.

15. The electronic gaming machine of claim 14, further comprising a plurality of speakers supported by the housing and configured to output audio in a frequency range different than the first ultrasound speaker and the second ultrasound speaker.

16. The electronic gaming machine of claim 15, wherein the plurality of instructions, when executed, cause the processor to:
cause a first speaker to output audio in a direction of the first player;
cause a second speaker to output audio in a direction of the second player; and
cause a third speaker to output audio in a direction between the first player and the second player.

17. The electronic gaming machine of claim 16, wherein the first speaker is positioned adjacent to the second ultrasound speaker, the second speaker is positioned adjacent to the first ultrasound speaker, and the third speaker is positioned between the first display device and the second display device.

18. An electronic gaming system comprising:
an electronic gaming machine comprising:
a housing;
a display device supported by the housing;
a head position tracker supported by the housing;
a binaural audio system supported by the housing;
a first ultrasound speaker supported by the housing;
a second ultrasound speaker supported by the housing, wherein the first ultrasound speaker and the second ultrasound speaker are in a stereo configuration with respect to a player position in front of the housing;
a processor; and
a memory device that stores a plurality of instructions that, when executed, cause the processor to:
cause the display device to display a play of a game;
cause the display device to display a 3D image to a player, wherein the 3D image includes a virtual object associated with 3D coordinates;
operate with the head position tracker to capture player head position information;
cause the binaural audio system to generate a stereo binaural audio stream including encoded binaural information based on the captured player head position information and the 3D coordinates associated with the virtual object;
cause the first ultrasound speaker to output a first sound beam based on the stereo binaural audio stream; and
cause the second ultrasound speaker to output a second sound beam based on the stereo binaural audio stream; and
a gaming chair comprising:
a frame;
a third ultrasound speaker supported by the frame; and
a fourth ultrasound speaker supported by the frame, wherein the third ultrasound speaker and the fourth ultrasound speaker are in a stereo configuration with respect to the player position at which a player can be seated in the gaming chair.

19. The electronic gaming system of claim 18, wherein the plurality of instructions, when executed, cause the processor to:
cause the third ultrasound speaker to output a third sound beam based on the stereo binaural audio stream; and
cause the fourth ultrasound speaker to output a fourth sound beam based on the stereo binaural audio stream.

20. The electronic gaming system of claim 19, wherein the plurality of instructions, when executed, cause the processor to:
cause the first ultrasound speaker, the second ultrasound speaker, the third ultrasound speaker, and the fourth ultrasound speaker to simultaneously output the respective sound beams.

21. The electronic gaming system of claim 18, wherein the gaming chair further comprises a speaker configured to output audio in a direction away from the player position.

* * * * *